United States Patent
Tsuji et al.

(10) Patent No.: US 10,619,047 B2
(45) Date of Patent: Apr. 14, 2020

(54) CURABLE COMPOSITION

(71) Applicant: DAICEL CORPORATION, Osaka-shi, Osaka (JP)

(72) Inventors: Naoko Tsuji, Himeji (JP); Hiroki Tanaka, Himeji (JP); Akira Yamakawa, Himeji (JP); Akihiro Shibamoto, Himeji (JP); Nobuhiko Harada, Himeji (JP)

(73) Assignee: DAICEL CORPORATION, Osaka-Shi (JP)

( * ) Notice: Subject to any disclaimer, the term of this patent is extended or adjusted under 35 U.S.C. 154(b) by 219 days.

(21) Appl. No.: 15/736,078

(22) PCT Filed: Jun. 7, 2016

(86) PCT No.: PCT/JP2016/066846
§ 371 (c)(1),
(2) Date: Dec. 13, 2017

(87) PCT Pub. No.: WO2016/204014
PCT Pub. Date: Dec. 22, 2016

(65) Prior Publication Data
US 2018/0163049 A1 Jun. 14, 2018

(30) Foreign Application Priority Data
Jun. 17, 2015 (JP) ................. 2015-122352

(51) Int. Cl.
*C08L 83/06* (2006.01)
*C09J 183/06* (2006.01)
(Continued)

(52) U.S. Cl.
CPC ............... *C08L 83/06* (2013.01); *B32B 7/12* (2013.01); *B32B 27/283* (2013.01);
(Continued)

(58) Field of Classification Search
None
See application file for complete search history.

(56) References Cited

U.S. PATENT DOCUMENTS 5,063,267 A 11/1991 Hanneman et al.
5,118,530 A 6/1992 Hanneman et al.
(Continued)

FOREIGN PATENT DOCUMENTS

JP 4-275337 A 9/1992
JP 2004-346144 A 12/2004
(Continued)

OTHER PUBLICATIONS

International Search Report (PCT/ISA/210) issued in PCT/JP2016/066846, dated Aug. 2, 2016.
(Continued)

*Primary Examiner* — Robert S Loewe
(74) *Attorney, Agent, or Firm* — Birch, Stewart, Kolasch & Birch, LLP

(57) ABSTRACT

Provided is a curable composition having excellent film-formability and can be cured at low temperatures to form a cured product that has heat resistance, cracking resistance, and adhesiveness and adhesion to an adherend at excellent levels. The curable composition according to the present invention is a composition containing polyorganosilsesquioxanes (A). The polyorganosilsesquioxanes (A) include (a-1) an epoxy-containing polyorganosilsesquioxane having a weight-average molecular weight of 3000 or more, and (a-2) an epoxy-containing polyorganosilsesquioxane having a weight-average molecular weight of 2500 or less. The polyorganosilsesquioxanes (A) contain the components (a-1) and (a-2) in a total content of 50 weight percent or more of the total amount of the polyorganosilsesquioxanes (A). The polyorganosilsesquioxanes (A) have a ratio in
(Continued)

content (weight ratio) of (a-1) to (a-2) of from 10:90 to 70:30.

20 Claims, 1 Drawing Sheet

(51) Int. Cl.
  *C09J 11/06*     (2006.01)
  *C09J 7/20*      (2018.01)
  *C08G 59/32*     (2006.01)
  *C09J 7/35*      (2018.01)
  *B32B 7/12*      (2006.01)
  *B32B 27/28*     (2006.01)
  *B32B 37/14*     (2006.01)
  *C09J 11/04*     (2006.01)
  *C08G 77/14*     (2006.01)
  *C08G 77/04*     (2006.01)
  *B32B 37/12*     (2006.01)

(52) U.S. Cl.
  CPC ........... *B32B 37/142* (2013.01); *C08G 59/32* (2013.01); *C09J 7/20* (2018.01); *C09J 7/35* (2018.01); *C09J 11/04* (2013.01); *C09J 11/06* (2013.01); *C09J 183/06* (2013.01); *B32B 2037/1253* (2013.01); *B32B 2250/03* (2013.01); *B32B 2305/72* (2013.01); *B32B 2383/00* (2013.01); *C08G 77/045* (2013.01); *C08G 77/14* (2013.01); *C08L 2205/025* (2013.01)

(56) References Cited

U.S. PATENT DOCUMENTS

| | | | | |
|---|---|---|---|---|
| 5,416,190 | A * | 5/1995 | Mine | C08G 77/36 528/492 |
| 6,596,821 | B1 * | 7/2003 | Katsoulis | C08G 77/04 525/474 |
| 8,026,332 | B2 * | 9/2011 | Kashio | C08G 77/04 528/10 |
| 2003/0055195 | A1 * | 3/2003 | Lee | C07F 7/21 528/10 |
| 2003/0212228 | A1 * | 11/2003 | Dai | C08G 77/04 528/10 |
| 2004/0247900 | A1 * | 12/2004 | Ogihara | C09D 183/04 428/447 |
| 2004/0253461 | A1 * | 12/2004 | Ogihara | C09D 183/04 428/447 |
| 2005/0042458 | A1 * | 2/2005 | Ghoshal | C08G 59/22 428/417 |
| 2006/0135723 | A1 | 6/2006 | Nakayama | |
| 2008/0131702 | A1 * | 6/2008 | Bae | C08G 59/245 428/418 |
| 2008/0249271 | A1 | 10/2008 | Beppu et al. | |
| 2009/0256287 | A1 * | 10/2009 | Fu | B82Y 10/00 264/447 |
| 2010/0244201 | A1 | 9/2010 | Kitada | |
| 2011/0054063 | A1 * | 3/2011 | Ooike | C08G 77/14 522/168 |
| 2012/0058333 | A1 * | 3/2012 | Yamamoto | C08G 77/16 428/336 |
| 2013/0331476 | A1 | 12/2013 | Bae et al. | |
| 2014/0367149 | A1 | 12/2014 | Kim | |
| 2015/0093585 | A1 | 4/2015 | Bae et al. | |
| 2015/0159044 | A1 | 6/2015 | Bae et al. | |
| 2015/0275043 | A1 | 10/2015 | Kikuchi et al. | |
| 2015/0353760 | A1 * | 12/2015 | Bae | C09D 163/00 523/456 |
| 2016/0107127 | A1 * | 4/2016 | Lee | B01D 69/125 96/4 |
| 2016/0200939 | A1 * | 7/2016 | Cho | C09D 183/04 136/257 |
| 2016/0297933 | A1 | 10/2016 | Kuwana et al. | |

FOREIGN PATENT DOCUMENTS

| | | |
|---|---|---|
| JP | 2008-248236 A | 10/2008 |
| JP | 2010-226060 A | 10/2010 |
| JP | 2012-62457 A | 3/2012 |
| JP | 2012-116989 A | 6/2012 |
| JP | 2014-169433 A | 9/2014 |
| JP | 2015-193747 A | 11/2015 |
| JP | 2015-212353 A | 11/2015 |
| TW | 201422751 A | 6/2014 |
| WO | WO 2004/072150 A1 | 8/2004 |

OTHER PUBLICATIONS

Written Opinion (PCT/ISA/237) issued in PCT/JP2016/066846, dated Aug. 2, 2016.
Extended European Search Report dated Dec. 21, 2018, issued in counterpart European Patent Application No. 16811489.0.
Taiwanese Office Action and Search Report for counterpart Taiwanese Application No. 105118862, dated Oct. 8, 2019.

* cited by examiner

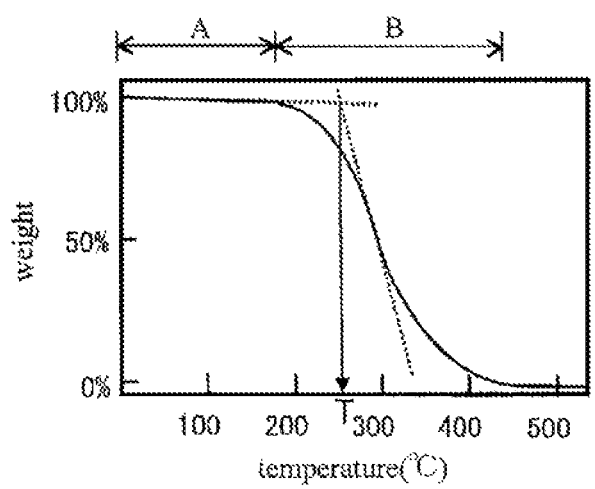

CURABLE COMPOSITION

TECHNICAL FIELD

The present invention relates to: a curable composition, an adhesive sheet including an adhesive layer derived from the curable composition, a cured product of the curable composition, and a stack resulting from bonding adherends using the curable composition. This application claims priority to Japanese Patent Application No. 2015-122352, filed Jun. 17, 2015 to Japan, the entire contents of which are incorporated herein by reference.

BACKGROUND ART

Thermosetting adhesives containing any of benzocyclobutene (BCB), novolac epoxy resins, and epoxy-containing polyorganosilsesquioxanes are known as adhesives for use in stacking of semiconductors and bonding of electronic components (Patent Literature (PTL) 1).

Disadvantageously, however, the thermosetting adhesives containing BCB require heating at high temperatures for curing, and exposure to such high temperatures may damage the adherends. Also disadvantageously, the thermosetting adhesives containing novolac epoxy resins, when subjected to high-temperature processes (for example, at 260° C. to 280° C.) such as lead-free solder reflow processes, are decomposed to outgas to thereby deteriorate in adhesion.

In contrast, the thermosetting adhesives containing epoxy-containing polyorganosilsesquioxanes can be cured at lower temperatures as compared with the thermosetting adhesives containing BCB, can form cured products having excellent adhesiveness (bonding properties) and adhesion to a substrate, and can maintain adhesiveness even when subjected to high-temperature processes. Disadvantageously, however, cured products of the thermosetting adhesives containing epoxy-containing polyorganosilsesquioxanes are susceptible to cracking caused by the application of cold thermal shocks.

CITATION LIST

Patent Literature

PTL 1: Japanese Unexamined Patent Application Publication (JP-A) No. 2010-226060

SUMMARY OF INVENTION

Technical Problem

The inventors of the present invention found that, of epoxy-containing polyorganosilsesquioxanes, compounds having a specific configuration have heat resistance and cracking resistance at excellent levels. The inventors, however, found that the compounds having the specific configuration, when applied typically to substrates (boards), are susceptible to crawling and tend to cause pitting or cratering in the coat layer surface. Namely, the inventors found that the compounds have poor film-formability.

Accordingly, the present invention has an object to provide a curable composition that has excellent film-formability and can be cured at a low temperature to give a cured product having heat resistance, cracking resistance (or cold thermal shock resistance), and adhesiveness and adhesion to an adherend at excellent levels.

The present invention has another object to provide a cured product of the curable composition.

The present invention has yet another object to provide an adhesive sheet including an adhesive layer formed using the curable composition.

The present invention has still another object to provide a stack resulting from bonding adherends through the curable composition.

Solution to Problem

After intensive investigations to achieve the objects, the inventors have found that a curable composition containing polyorganosilsesquioxanes, when controlled in the molecular weights of the polyorganosilsesquioxanes, can give a cured product that has heat resistance and cracking resistance both being controlled. In addition, the inventors have found that a curable composition including polyorganosilsesquioxanes containing a polyorganosilsesquioxane having a weight-average molecular weight of 2500 or less and a polyorganosilsesquioxane having a weight-average molecular weight of 3000 or more in specific proportions has excellent film-formability and can give a cured product having heat resistance and cracking resistance at excellent levels. The present invention has been made on the basis of these findings.

Specifically, the present invention provides a curable composition containing polyorganosilsesquioxanes (A). The polyorganosilsesquioxanes (A) contain a polyorganosilsesquioxane (a-1) having a weight-average molecular weight of 3000 or more, and a polyorganosilsesquioxane (a-2) having a weight-average molecular weight of 2500 or less. The polyorganosilsesquioxanes (A) contain the polyorganosilsesquioxane (a-1) and the polyorganosilsesquioxane (a-2) in combination in a total content of 50 weight percent or more of the total amount of the polyorganosilsesquioxanes (A). The polyorganosilsesquioxanes (A) have a ratio (weight ratio) in content of the polyorganosilsesquioxane (a-1) to the polyorganosilsesquioxane (a-2) of from 10:90 to 70:30. The polyorganosilsesquioxanes (a-1) and (a-2) each independently include a constitutional unit represented by Formula (1):

wherein $R^1$ represents an epoxy-containing group. The polyorganosilsesquioxanes (a-1) and (a-2) each independently have a mole ratio of a constitutional unit represented by Formula (I) to a constitutional unit represented by Formula (II) of 5 or more, where Formulae (I) and (II) are expressed as follows:

wherein $R^a$ is selected from an epoxy-containing group, substituted or unsubstituted aryl, substituted or unsubstituted aralkyl, substituted or unsubstituted cycloalkyl, substituted or unsubstituted alkyl, substituted or unsubstituted alkenyl, and hydrogen,

wherein $R^b$ is selected from an epoxy-containing group, substituted or unsubstituted aryl, substituted or unsubstituted aralkyl, substituted or unsubstituted cycloalkyl, substituted or unsubstituted alkyl, substituted or unsubstituted alkenyl, and hydrogen; and $R^c$ is selected from hydrogen and $C_1$-$C_4$ alkyl. The polyorganosilsesquioxanes (a-1) and (a-2) each independently have a total proportion of the constitutional unit represented by Formula (1) and a constitutional unit represented by Formula (4) of 55 to 100 mole percent of the total amount (100 mole percent) of siloxane constitutional units constituting the polyorganosilsesquioxane (a-1) or (a-2), where Formula (4) is expressed as follows:

$$[R^1SiO_{2/2}(OR^c)] \quad (4)$$

wherein $R^1$ is as defined in Formula (1); and $R^c$ is as defined in Formula (II).

In the curable composition, the polyorganosilsesquioxane (a-1) and the polyorganosilsesquioxane (a-2) may each independently further include a constitutional unit represented by Formula (2):

$$[R^2SiO_{3/2}] \quad (2)$$

wherein $R^2$ is selected from substituted or unsubstituted aryl, substituted or unsubstituted aralkyl, substituted or unsubstituted cycloalkyl, substituted or unsubstituted alkyl, and substituted or unsubstituted alkenyl.

In the curable composition, $R^1$ may be a group selected from the class consisting of groups represented by Formulae (1a), (1b), (1c), and (1d):

[Chem. 1]

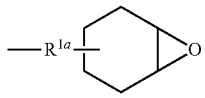
(1a)

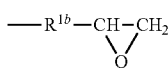
(1b)

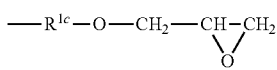
(1c)

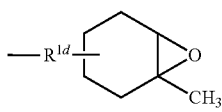
(1d)

wherein $R^{1a}$, $R^{1b}$, $R^{1c}$, and $R^{1d}$ each represent, identically or differently, linear or branched alkylene.

In the curable composition, $R^2$ may be substituted or unsubstituted aryl.

The curable composition may further include a polymerization initiator.

The curable composition may further include a polymerization stabilizer.

The curable composition may further include a silane coupling agent.

The curable composition may be an adhesive composition.

The present invention also provides a cured product of the curable composition.

The present invention also provides an adhesive sheet including a substrate, and an adhesive layer on or over the substrate. The adhesive layer is a layer of the curable composition.

The present invention also provides a stack including three or more layers. The three or more layers include two adherend layers, and a bonding layer between the adherend layers. The bonding layer is a layer of a cured product of the curable composition.

The present invention also provides a device including the stack.

Specifically, the present invention relates to the following:

(1) A curable composition containing polyorganosilsesquioxanes (A), the polyorganosilsesquioxanes (A) containing a polyorganosilsesquioxane (a-1) having a weight-average molecular weight of 3000 or more, and a polyorganosilsesquioxane (a-2) having a weight-average molecular weight of 2500 or less, the polyorganosilsesquioxanes (A) containing the polyorganosilsesquioxane (a-1) and the polyorganosilsesquioxane (a-2) in combination in a total content of 50 weight percent or more of the total amount of the polyorganosilsesquioxanes (A), the polyorganosilsesquioxanes (A) having a ratio (weight ratio) in content of the polyorganosilsesquioxane (a-1) to the polyorganosilsesquioxane (a-2) of from 10:90 to 70:30, the polyorganosilsesquioxanes (a-1) and (a-2) each independently including a constitutional unit represented by Formula (1):

$$[R^1SiO_{3/2}] \quad (1)$$

wherein $R^1$ represents an epoxy-containing group, the polyorganosilsesquioxanes (a-1) and (a-2) each independently having a mole ratio of a constitutional unit represented by Formula (I) to a constitutional unit represented by Formula (II) of 5 or more, Formulae (I) and (II) expressed as follows:

$$[R^aSiO_{3/2}] \quad (I)$$

wherein $R^a$ is selected from an epoxy-containing group, substituted or unsubstituted aryl, substituted or unsubstituted aralkyl, substituted or unsubstituted cycloalkyl, substituted or unsubstituted alkyl, substituted or unsubstituted alkenyl, and hydrogen, $$[R^bSiO_{2/2}(OR^c)] \quad (II)$$

wherein $R^b$ is selected from an epoxy-containing group, substituted or unsubstituted aryl, substituted or unsubstituted aralkyl, substituted or unsubstituted cycloalkyl, substituted or unsubstituted alkyl, substituted or unsubstituted alkenyl, and hydrogen; and $R^c$ is selected from hydrogen and $C_1$-$C_4$ alkyl, the polyorganosilsesquioxanes (a-1) and (a-2) each independently having a total proportion of the constitutional unit represented by Formula (1) and a constitutional unit represented by Formula (4) of 55 to 100 mole percent of the total amount (100 mole percent) of siloxane constitutional units constituting the polyorganosilsesquioxane (a-1) or (a-2), Formula (4) expressed as follows:

$$[R^1SiO_{2/2}(OR^c)] \quad (4)$$

wherein $R^1$ is as defined in Formula (1); and $R^c$ is as defined in Formula (II).

(2) The curable composition according to (1), wherein the polyorganosilsesquioxane (a-1) and the polyorganosilsesquioxane (a-2) each independently further include a constitutional unit represented by Formula (2):

$$[R^2SiO_{3/2}] \quad (2)$$

wherein $R^2$ is selected from substituted or unsubstituted aryl, substituted or unsubstituted aralkyl, substituted or unsubstituted cycloalkyl, substituted or unsubstituted alkyl, and substituted or unsubstituted alkenyl.

(3) The curable composition according to (2), wherein the polyorganosilsesquioxane (a-1) further includes a constitutional unit represented by Formula (5):

$$[R^2SiO_{2/2}(OR^c)] \quad (5)$$

wherein $R^2$ is selected from substituted or unsubstituted aryl, substituted or unsubstituted aralkyl, substituted or unsubstituted cycloalkyl, substituted or unsubstituted alkyl, and substituted or unsubstituted alkenyl; and $R^c$ is as defined in Formula (II), and wherein the polyorganosilsesquioxane (a-1) has a total proportion of the constitutional unit represented by Formula (2) and the constitutional unit represented by Formula (5) of 0 to 70 mole percent (preferably 0 to 60 mole percent, more preferably 0 to 40 mole percent, and particularly preferably 1 to 15 mole percent) of the total amount (100 mole percent) of siloxane constitutional units.

(4) The curable composition according to one of (2) and (3), wherein the polyorganosilsesquioxane (a-2) further includes a constitutional unit represented by Formula (5):

wherein $R^2$ is selected from substituted or unsubstituted aryl, substituted or unsubstituted aralkyl, substituted or unsubstituted cycloalkyl, substituted or unsubstituted alkyl, and substituted or unsubstituted alkenyl; and $R^c$ is as defined in Formula (II), and wherein the polyorganosilsesquioxane (a-2) has a total proportion of the constitutional unit represented by Formula (2) and the constitutional unit represented by Formula (5) of 0 to 70 mole percent (preferably 0 to 60 mole percent, more preferably 0 to 40 mole percent, and particularly preferably 1 to 15 mole percent) of the total amount (100 mole percent) of siloxane constitutional units.

(5) The curable composition according to one of (3) and (4), wherein the polyorganosilsesquioxane (a-1) has a total proportion of the constitutional unit represented by Formula (1), the constitutional unit represented by Formula (2), the constitutional unit represented by Formula (4), and the constitutional unit represented by Formula (5) of 60 to 100 mole percent (preferably 70 to 100 mole percent, and more preferably 80 to 100 mole percent) of the total amount (100 mole percent) of siloxane constitutional units constituting the polyorganosilsesquioxane (a-1).

(6) The curable composition according to any one of (3) to (5), wherein the polyorganosilsesquioxane (a-2) has a total proportion of the constitutional unit represented by Formula (1), the constitutional unit represented by Formula (2), the constitutional unit represented by Formula (4), and the constitutional unit represented by Formula (5) of 60 to 100 mole percent (preferably 70 to 100 mole percent, and more preferably 80 to 100 mole percent) of the total amount (100 mole percent) of siloxane constitutional units constituting the polyorganosilsesquioxane (a-2).

(7) The curable composition according to any one of (1) to (6), wherein the polyorganosilsesquioxanes (A) contain the polyorganosilsesquioxane (a-1) in a content of 10 to 70 weight percent of the total amount of the polyorganosilsesquioxanes (A).

(8) The curable composition according to any one of (1) to (7), wherein the polyorganosilsesquioxanes (A) contain the polyorganosilsesquioxane (a-2) in a content of 30 to 90 weight percent of the total amount of the polyorganosilsesquioxanes (A).

(9) The curable composition according to any one of (1) to (8), wherein the polyorganosilsesquioxanes (A) have a molecular-weight dispersity (Mw/Mn) of 1.0 to 3.0 as determined by GPC and calibrated with a polystyrene standard.

(10) The curable composition according to any one of (1) to (9), wherein the polyorganosilsesquioxanes (A) have a weight-average molecular weight (Mw) of 800 to 100000 as determined by GPC and calibrated with a polystyrene standard.

(11) The curable composition according to any one of (1) to (10), wherein $R^1$ is a group selected from the class consisting of groups represented by Formulae (1a), (1b), (1c), and (1d).

(12) The curable composition according to any one of (1) to (10), wherein $R^1$ is a group selected from the class consisting of groups represented by Formulae (1a) and (1c).

(13) The curable composition according to any one of (1) to (10), wherein $R^1$ is a 2-(3',4'-epoxycyclohexyl)ethyl group.

(14) The curable composition according to any one of (2) to (13), wherein $R^2$ is substituted or unsubstituted aryl.

(15) The curable composition according to any one of (1) to (14), wherein the curable composition contains the polyorganosilsesquioxanes (A) in a proportion of 70 to 100 weight percent of the total amount of curable compounds contained in the curable composition.

(16) The curable composition according to any one of (1) to (15), wherein the polyorganosilsesquioxane (a-1) is present in a proportion of 10 to 70 weight percent (preferably 10 to 65 weight percent, and particularly preferably 20 to 60 weight percent) of the total amount of curable compounds contained in the curable composition.

(17) The curable composition according to any one of (1) to (16), wherein the polyorganosilsesquioxane (a-2) is present in a proportion of 30 to 90 weight percent (preferably 35 to 85 weight percent, and particularly preferably 40 to 75 weight percent) of the total amount of curable compounds contained in the curable composition.

(18) The curable composition according to any one of (1) to (17), further including a polymerization initiator.

(19) The curable composition according to any one of (1) to (18), further including a polymerization stabilizer.

(20) The curable composition according to any one of (1) to (19), further including a silane coupling agent.

(21) The curable composition according to any one of (1) to (20), which has a viscosity of 1 to 5000 mPa·s at 25° C.

(22) The curable composition according to any one of (1) to (21), which is an adhesive composition.

(23) A cured product of the curable composition according to any one of (1) to (22).

(24) An adhesive sheet, including a substrate and an adhesive layer on or over the substrate, the adhesive layer being a layer of the curable composition according to (22).

(25) A stack including three or more layers, the three or more layers including two adherend layers, and a bonding layer between the adherend layers, the bonding layer being a layer of a cured product of the curable composition according to (22).

(26) A device including the stack according to (25).

Advantageous Effects of Invention

The curable composition according to the present invention contains a polyorganosilsesquioxane having a weight-average molecular weight of 2500 or less and a polyorganosilsesquioxane having a weight-average molecular weight of 3000 or more in specific proportions, thereby has excellent film-formability, resists crawling upon application typically to a substrate, and can give a coat layer having satisfactory surface smoothness. In addition, the curable composition can be cured at a low temperature to form a cured product having heat resistance, cracking resistance, and adhesiveness and adhesion to an adherend at excellent levels. The curable composition according to the present invention is therefore advantageously usable as a composition for an adhesive (adhesive composition; adhesive). The adhesive composition, when used, can give an adhesive sheet and a stack (laminate).

Cracking and/or separation (or delamination), if occurring in a bonding layer of a stack, causes adherend layer separation and/or wiring (interconnection) failure, and, as a result, causes failure of a device including the stack. However, the stack formed using the curable composition according to the present invention as an adhesive can give a device having high reliability without cracking and separation (or delamination) of the bonding layer.

The stack according to the present invention, when being a three-dimensional stack of semiconductor chips, is more highly integrated and consumes less power as compared with conventional semiconductors (semiconductor chips). The use of the stack according to the present invention therefore provides smaller electronic devices having higher performance.

BRIEF DESCRIPTION OF DRAWING

FIG. 1 is a graph illustrating how to evaluate heat resistance of a cured product (a graph schematically illustrating the result of thermogravimetry).

DESCRIPTION OF EMBODIMENTS

Polyorganosilsesquioxanes (A)

The polyorganosilsesquioxanes (A) contain (a-1) a polyorganosilsesquioxane having a weight-average molecular weight of 3000 or more, and (a-2) a polyorganosilsesquioxane having a weight-average molecular weight of 2500 or less. The polyorganosilsesquioxane (a-1) and the polyorganosilsesquioxane (a-2) are present in combination in a total content of 50 weight percent or more of the total amount of the polyorganosilsesquioxanes (A). The ratio (weight ratio) in content of the polyorganosilsesquioxane (a-1) to the polyorganosilsesquioxane (a-2) is from 10:90 to 70:30. The polyorganosilsesquioxanes (a-1) and (a-2) each independently include a constitutional unit represented by Formula (1):

$$[R^1SiO_{3/2}] \quad (1)$$

wherein $R^1$ represents an epoxy-containing group. The polyorganosilsesquioxanes (a-1) and (a-2) each independently have a mole ratio of a constitutional unit represented by Formula (I) to a constitutional unit represented by Formula (II) of 5 or more. Formulae (I) and (II) are expressed as follows:

$$[R^aSiO_{3/2}] \quad (I)$$

wherein $R^a$ is selected from an epoxy-containing group, substituted or unsubstituted aryl, substituted or unsubstituted aralkyl, substituted or unsubstituted cycloalkyl, substituted or unsubstituted alkyl, substituted or unsubstituted alkenyl, and hydrogen,

$$[R^bSiO_{2/2}(OR^c)] \quad (II)$$

wherein $R^b$ is selected from an epoxy-containing group, substituted or unsubstituted aryl, substituted or unsubstituted aralkyl, substituted or unsubstituted cycloalkyl, substituted or unsubstituted alkyl, substituted or unsubstituted alkenyl, and hydrogen; and $R^c$ is selected from hydrogen and $C_1$-$C_4$ alkyl. Hereinafter, the constitutional unit represented by Formula (I) is also referred to as a "T3 species"; the constitutional unit represented by Formula (II) is also referred to as a "T2 species"; and the ratio of the constitutional unit represented by Formula (I) to the constitutional unit represented by Formula (II) is also referred to as a "T3 to T2 ratio". In addition, the polyorganosilsesquioxanes (a-1) and (a-2) each independently have a total proportion (total amount) of the constitutional unit represented by Formula (1) and a constitutional unit represented by Formula (4) of 55 to 100 mole percent of the total amount (100 mole percent) of siloxane constitutional units constituting the polyorganosilsesquioxane (a-1) or (a-2). Formula (4) is expressed as follows:

$$[R^1SiO_{2/2}(OR^c)] \quad (4)$$

wherein $R^1$ is as defined in Formula (1); and $R^c$ is as defined in Formula (II).

When more specifically described, the constitutional unit represented by Formula (I) is represented by Formula (I'); and the constitutional unit represented by Formula (II) is represented by Formula (II'). In the structure represented by Formula (I'), the three oxygen atoms, which are bonded to the specified silicon atom, are respectively bonded to three other silicon atoms (silicon atoms not shown in Formula (I')). In the structure represented by Formula (II'), the two oxygen atoms, which are positioned above and below the specified silicon atom, are bonded respectively to two other silicon atoms (silicon atoms not shown in Formula (II')). Specifically, both the T3 species and the T2 species are constitutional units (so-called T units) generally represented by the formula: $[RSiO_{3/2}]$ and result from hydrolysis and condensation of corresponding hydrolyzable trifunctional silane compounds. In the formula, R is selected from hydrogen and a monovalent organic group; hereinafter the same. Formulae (I') and (II') are expressed as follows:

[Chem. 2]

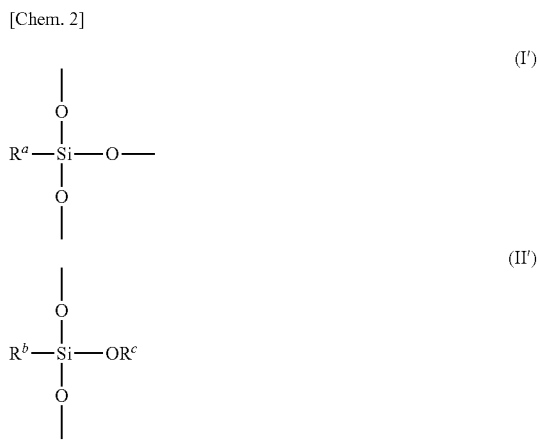

$R^a$ in Formula (I) (also $R^a$ in Formula (I')) and $R^b$ in Formula (II) (also $R^b$ in Formula (II')) are each independently selected from an epoxy-containing group, substituted or unsubstituted aryl, substituted or unsubstituted aralkyl, substituted or unsubstituted cycloalkyl, substituted or unsubstituted alkyl, substituted or unsubstituted alkenyl, and hydrogen. Specifically, the epoxy-containing group, substituted or unsubstituted aryl, substituted or unsubstituted aralkyl, substituted or unsubstituted cycloalkyl, substituted or unsubstituted alkyl, and substituted or unsubstituted alkenyl as $R^a$ and $R^b$ are exemplified as with $R^1$ in Formula (1) and $R^2$ in Formula (2) described below. $R^a$ in Formula (I) and $R^b$ in Formula (II) are each independently derived from a group bonded to the silicon atom in a hydrolyzable trifunctional silane compound used as a starting material to form the polyorganosilsesquioxane, where the group bonded to the silicon atom is a group other than alkoxy and halogen and is exemplified typically by $R^1$, $R^2$, and hydrogen in after-mentioned Formulae (a), (b), and (c).

The OR$^c$ group in Formula (II) (also the OR$^c$ group in Formula (II')) is selected from hydroxy and C$_1$-C$_4$ alkoxy. Non-limiting examples of the C$_1$-C$_4$ alkoxy include C$_1$-C$_4$ alkoxys such as methoxy, ethoxy, propoxy, isopropyloxy, butoxy, and isobutyloxy. The OR$^c$ group in Formula (II) is generally derived from alkoxy in a hydrolyzable silane compound used as a starting material to form the polyorganosilsesquioxane. The alkoxy is exemplified typically by alkoxys exemplified as after-mentioned X$^1$ to X$^3$.

The constitutional unit represented by Formula (1) is a T unit (more specifically, a T3 species) and results from hydrolysis and condensation of a corresponding hydrolyzable trifunctional silane compound (such as an after-mentioned compound represented by Formula (a)).

R$^1$ in Formula (1) represents an epoxy-containing group (monovalent group). The epoxy-containing group is exemplified by, but not limited to, known or common groups each containing an oxirane ring, but is preferably a group selected from the class consisting of groups represented by Formulae (1a), (1b), (1c), and (1d); more preferably selected from groups represented by Formulae (1a) and (1c); and particularly preferably selected from groups represented by Formula (1a). These groups are preferred from the viewpoints of curability of the curable composition and heat resistance of the cured product. Formulae (1a), (1b), (1c), and (1d) are expressed as follows:

[Chem. 3]

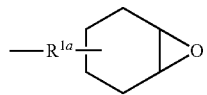
(1a)

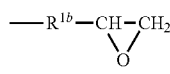
(1b)

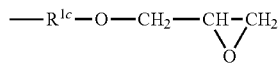
(1c)

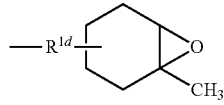
(1d)

In the formulae, R$^{1a}$, R$^{1b}$, R$^{1c}$, and R$^{1d}$ each represent, identically or differently, linear or branched alkylene and are exemplified typically by C$_1$-C$_{10}$ linear or branched alkylenes such as methylene, methylmethylene, dimethylmethylene, ethylene, propylene, trimethylene, tetramethylene, pentamethylene, hexamethylene, and decamethylene.

In particular, R$^{1a}$, R$^{1b}$, R$^{1c}$, and R$^{1d}$ are each independently preferably selected from C$_1$-C$_4$ linear (straight-chain) alkylenes and C$_3$ or C$_4$ branched (branched-chain) alkylenes; more preferably selected from ethylene, trimethylene, and propylene; and furthermore preferably selected from ethylene and trimethylene.

In particular, R$^1$ in Formula (1) is preferably a group represented by Formula (1a) in which R$^{1a}$ is ethylene. For example, R$^1$ is preferably a 2-(3',4'-epoxycyclohexyl)ethyl group.

The polyorganosilsesquioxanes (a-1) and (a-2) may independently include each of different constitutional units represented by Formula (1) alone or in combination.

In addition to the constitutional unit(s) represented by Formula (1), the polyorganosilsesquioxanes (a-1) and (a-2) may each independently further include a constitutional unit represented by Formula (2) as a T unit (more specifically, a T3 species). Formula (2) is expressed as follows:

$$[R^2SiO_{3/2}] \quad (2)$$

The constitutional unit represented by Formula (2) results from hydrolysis and condensation of a corresponding hydrolyzable trifunctional silane compound (such as an after-mentioned compound represented by Formula (b)).

R$^2$ in Formula (2) is selected from substituted or unsubstituted aryl, substituted or unsubstituted aralkyl, substituted or unsubstituted cycloalkyl, substituted or unsubstituted alkyl, and substituted or unsubstituted alkenyl. Non-limiting examples of the aryl include phenyl, tolyl, and naphthyl. Non-limiting examples of the aralkyl include benzyl and phenethyl. Non-limiting examples of the cycloalkyl include cyclobutyl, cyclopentyl, and cyclohexyl. Non-limiting examples of the alkyl include linear or branched alkyls such as methyl, ethyl, propyl, n-butyl, isopropyl, isobutyl, s-butyl, t-butyl, and isopentyl. Non-limiting examples of the alkenyl include linear or branched alkenyls such as vinyl, allyl, and isopropenyl.

Non-limiting examples of the substituted aryl, substituted aralkyl, substituted cycloalkyl, substituted alkyl, and substituted alkenyl include groups resulting from replacing part or all of hydrogen atoms or the principal chain skeleton of the aryls, aralkyls, cycloalkyls, alkyls, and alkenyls with at least one selected from the class consisting of ether groups, ester groups, carbonyls, siloxane groups, halogens (such as fluorine), acryls, methacryls, mercaptos, aminos, and hydroxys.

In particular, R$^2$ is preferably selected from substituted or unsubstituted aryls, substituted or unsubstituted alkyls, and substituted or unsubstituted alkenyls; is more preferably selected from substituted or unsubstituted aryls; and is furthermore preferably phenyl.

The proportions of the constitutional unit represented by Formula (1) and the constitutional unit represented by Formula (2) in the polyorganosilsesquioxanes (a-1) and (a-2) may be adjusted as appropriate by the formula (proportions) of starting materials (hydrolyzable trifunctional silanes) to form these constitutional units.

The polyorganosilsesquioxanes may each independently further include one or more other T units (in particular, other T3 species) than the constitutional units represented by Formula (1) and the constitutional units represented by Formula (2). A non-limiting example of the other T units is a constitutional unit represented by Formula (3):

$$[HSiO_{3/2}] \quad (3)$$

The polyorganosilsesquioxanes (a-1) and (a-2) each independently have a T3 to T2 ratio of 5 or more. This means that the T2 species is present in a proportion at a certain level or higher relative to the T3 species. Non-limiting examples of such T2 species include constitutional units represented by Formula (4), constitutional units represented by Formula (5), and constitutional units represented by Formula (6). In the formulae, R$^1$, R$^2$, and OR$^c$ are as defined above. Formulae (4), (5), and (6) are expressed as follows:

$$[R^1SiO_{2/2}(OR^c)] \quad (4)$$

$$[R^2SiO_{2/2}(OR^c)] \quad (5)$$

$$[HSiO_{2/2}(OR^c)] \quad (6)$$

The polyorganosilsesquioxanes (a-1) and (a-2) each independently have a ratio (T3 to T2 ratio) of the constitutional unit represented by Formula (I) (T3 species) to the constitutional unit represented by Formula (II) (T2 species) of 5 or more. The T3 to T2 ratio is preferably 5 to 18, more preferably 6 to 16, and furthermore preferably 7 to 14. The polyorganosilsesquioxanes, as having a T3 to T2 ratio of 5 or more, allow the cured product to have significantly higher adhesiveness.

The T3 to T2 ratios of the polyorganosilsesquioxanes (a-1) and (a-2) may be determined typically by $^{29}$Si-NMR spectra measurement. In $^{29}$Si-NMR spectra, the silicon atom in the constitutional unit represented by Formula (I) (T3 species) and the silicon atom in the constitutional unit represented by Formula (II) (T2 species) give signals (peaks) at different positions due to chemical shift. These peaks are independently integrated, and the ratio between them is calculated to determine the T3 to T2 ratio.

The $^{29}$Si-NMR spectra of polyorganosilsesquioxanes may be measured with an apparatus under conditions as follows:
  Measuring apparatus: JNM-ECA 500 NMR (trade name, supplied by JEOL Ltd.)
  Solvent: deuterated chloroform
  Number of scans: 1800
  Measurement temperature: 25° C.

In general, complete-cage (fully condensed cage) silsesquioxanes are polyorganosilsesquioxanes that include T3 species alone and are devoid of T2 species in a molecule.

On the basis of this, it is suggested that the polyorganosilsesquioxanes having a T3 to T2 ratio of 5 or more each have a partial-cage (incomplete-cage) silsesquioxane structure.

When the polyorganosilsesquioxanes (a-1) and (a-2) do not give intrinsic absorption peaks individually at around 1050 cm$^{-1}$ and at around 1150 cm$^{-1}$, but give one intrinsic absorption peak at around 1100 cm$^{-1}$ in the FT-IR spectra, it is verified that the polyorganosilsesquioxanes (a-1) and (a-2) have cage (in particular, partial-cage) silsesquioxane structures (reference: R. H. Raney, M. Itoh, A. Sakakibara, and T. Suzuki, Chem. Rev. 95, 1409(1995)). In contrast, a polyorganosilsesquioxane, when giving intrinsic absorption peaks individually at around 1050 cm$^{-1}$ and at around 1150 cm$^{-1}$ in an FT-IR spectrum, is identified to have a ladder silsesquioxane structure. The FT-IR spectra of polyorganosilsesquioxanes may be measured with an apparatus under conditions as follows:
  Measuring apparatus: FT-720 (trade name, supplied by HORIBA, Ltd.)
  Measurement method: through transmission
  Resolution: 4 cm$^{-1}$
  Measurement wavenumber range: 400 to 4000 cm$^{-1}$
  Number of scans: 16

The polyorganosilsesquioxanes (a-1) and (a-2) may each independently further include one or more other units than the T units. For example, the polyorganosilsesquioxanes (a-1) and (a-2) may further include at least one siloxane constitutional unit selected from the class consisting of: constitutional units represented by the formula [$R_3SiO_{1/2}$] (so-called M units), constitutional units represented by the formula [$R_2SiO$] (so-called D units), and constitutional units represented by the formula [$SiO_2$] (so-called Q units).

The polyorganosilsesquioxanes (a-1) and (a-2) each independently have a total proportion (total amount) of the constitutional unit represented by Formula (1) and the constitutional unit represented by Formula (4) of 55 to 100 mole percent of the total amount (100 mole percent) of siloxane constitutional units (the total amount of all siloxane constitutional units: M units, D units, T units, and Q units), as described above. The total proportion is preferably 65 to 100 mole percent, and more preferably 80 to 99 mole percent. The polyorganosilsesquioxanes, as having a total proportion as mentioned above of 55 mole percent or more, allow the curable composition to have better curability and allow the cured product to have significantly higher adhesiveness. The proportions of the siloxane constitutional units may be calculated typically according to the formula (proportions) of starting materials and/or by NMR spectra measurement.

The polyorganosilsesquioxanes (a-1) and (a-2) may each independently have a total proportion (total amount) of the constitutional unit represented by Formula (2) and the constitutional unit represented by Formula (5) of not limited, but preferably 0 to 70 mole percent, more preferably 0 to 60 mole percent, furthermore preferably 0 to 40 mole percent, and particularly preferably 1 to 15 mole percent, of the total amount (100 mole percent) of siloxane constitutional units (the total amount of all siloxane constitutional units: M units, D units, T units, and Q units) contained in the polyorganosilsesquioxane (a-1) or (a-2). The polyorganosilsesquioxanes (a-1) and (a-2), when having a total proportion of these constitutional units of 70 mole percent or less, can have a relatively larger total proportion of the constitutional unit represented by Formula (1) and the constitutional unit represented by Formula (4), thereby tend to allow the curable composition to have better curability, and to allow the cured product to have still higher adhesiveness.

The polyorganosilsesquioxanes (a-1) and (a-2) may each independently have a total proportion (total amount) of the constitutional unit represented by Formula (1), the constitutional unit represented by Formula (2), the constitutional unit represented by Formula (4), and the constitutional unit represented by Formula (5) of not limited, but preferably 60 to 100 mole percent, more preferably 70 to 100 mole percent, and furthermore preferably 80 to 100 mole percent, of the total amount (100 mole percent) of siloxane constitutional units (the total amount of all siloxane constitutional units: M units, D units, T units, and Q units) in the polyorganosilsesquioxane (a-1) or (a-2). The polyorganosilsesquioxanes (a-1) and (a-2), when having a total proportion of these constitutional units of 60 mole percent or more, tend to allow the cured product to have still higher adhesiveness.

The polyorganosilsesquioxane (a-1) has a weight-average molecular weight of 3000 or more as determined by GPC and calibrated with a polystyrene standard, as described above. The weight-average molecular weight is preferably 3000 to 1000000, more preferably 3000 to 100000, and particularly preferably 3000 to 50000.

The polyorganosilsesquioxane (a-2) has a weight-average molecular weight of 2500 or less as determined by GPC and calibrated with a polystyrene standard, as described above. The weight-average molecular weight is preferably 400 to 2500, more preferably 800 to 2500, and particularly preferably 1000 to 2500.

The polyorganosilsesquioxane (a-1) and the polyorganosilsesquioxane (a-2) are present in combination in a total content of 50 weight percent or more, preferably 70 weight percent or more, and particularly preferably 90 weight percent or more, of the total amount of the polyorganosilsesquioxanes (A).

The polyorganosilsesquioxane (a-1) may be present in a content of typically 10 to 70 weight percent, preferably 15 to 65 weight percent, and particularly preferably 25 to 60 weight percent, of the total amount of the polyorganosilsesquioxanes (A).

The polyorganosilsesquioxane (a-2) may be present in a content of typically 30 to 90 weight percent, preferably 35 to 85 weight percent, and particularly preferably 40 to 75 weight percent, of the total amount of the polyorganosilsesquioxanes (A).

The ratio (weight ratio) in content of the polyorganosilsesquioxane (a-1) to the polyorganosilsesquioxane (a-2) is from 10:90 to 70:30, preferably from 15:85 to 65:35, and particularly preferably from 25:75 to 60:40. The ratio in content of the polyorganosilsesquioxane (a-1) to the polyorganosilsesquioxane (a-2) in the curable composition or in the polyorganosilsesquioxanes (A) may be determined by performing GPC analysis to give a chromatogram, subjecting the chromatogram to waveform separation, individually integrating peaks, and calculating the ratio between the integrated peaks.

The polyorganosilsesquioxanes (A) may have a molecular-weight dispersity (Mw/Mn) of typically 1.0 to 3.0, preferably 1.1 to 2.0, more preferably 1.2 to 1.9, and particularly preferably 1.45 to 1.80, as determined by GPC and calibrated with a polystyrene standard. The polyorganosilsesquioxanes (A), when having a molecular-weight dispersity of 3.0 or less, tend to allow the cured product to have still higher adhesiveness. In contrast, the polyorganosilsesquioxanes (A), when having a molecular-weight dispersity of 1.0 or more (preferably 1.1 or more), tend to readily become liquid and to offer better handleability.

The polyorganosilsesquioxanes (A) have a weight-average molecular weight (Mw) of typically 800 to 100000, preferably 1000 to 50000, particularly preferably 1700 to 10000, especially preferably 1700 to 5000, and most preferably 1700 to 2500, as determined by GPC and calibrated with a polystyrene standard.

The weight-average molecular weights and molecular-weight dispersities of such polyorganosilsesquioxanes may be measured with an apparatus under conditions as described in examples (working examples) mentioned below.

The curable composition according to the present invention includes the polyorganosilsesquioxanes (A) containing the polyorganosilsesquioxanes (a-1) and (a-2) in proportions within specific ranges, thereby has excellent film-formability, and can form a cured product having heat resistance and cracking resistance at excellent levels.

The polyorganosilsesquioxanes (a-1) and (a-2) may each be produced typically by hydrolyzing and condensing one or more hydrolyzable silane compounds. However, the one or more hydrolyzable silane compounds for use herein should include, as an essential hydrolyzable silane compound, a hydrolyzable trifunctional silane compound to form the constitutional unit represented by Formula (1) (a compound represented by Formula (a)).

More specifically, the polyorganosilsesquioxanes (a-1) and (a-2) can each be produced typically by hydrolyzing and condensing a compound represented by Formula (a) as needed in combination with at least one of a compound represented by Formula (b) and a compound represented by Formula (c), where these compounds are hydrolyzable silane compounds to form T units. Formulae (a), (b), and (c) are expressed as follows:

$R^1\text{-Si}(X^1)_3$          (a)

$R^2\text{Si}(X^2)_3$          (b)

$\text{HSi}(X^3)_3$          (c)

The compound represented by Formula (a) is a compound to form the constitutional unit represented by Formula (1) and the constitutional unit represented by Formula (4) in the polyorganosilsesquioxanes (a-1) and (a-2). $R^1$ in Formula (a) corresponds to $R^1$ in Formulae (1) and (4).

$X^1$ in Formula (a) is, independently in each occurrence, selected from alkoxy and halogen. The alkoxy as X is exemplified as with the $C_1$-$C_4$ alkoxys in the $OR^e$ group. Non-limiting examples of the halogen as $X^t$ include fluorine, chlorine, bromine, and iodine. In particular, $X^1$ is preferably selected from alkoxys, and more preferably selected from methoxy and ethoxy. The three occurrences of $X^1$ may be identical to or different from one another.

The compound represented by Formula (b) is a compound to form the constitutional unit represented by Formula (2) and the constitutional unit represented by Formula (5) in the polyorganosilsesquioxanes (a-1) and (a-2). $R^2$ in Formula (b) corresponds to $R^2$ in Formulae (2) and (5).

$X^2$ in Formula (b) is, independently in each occurrence, selected from alkoxy and halogen. $X^2$ is exemplified as with $X^1$. In particular, $X^2$ is preferably selected from alkoxys, and more preferably selected from methoxy and ethoxy. The three occurrences of $X^2$ may be identical to or different from one another.

The compound represented by Formula (c) is a compound to form the constitutional unit represented by Formula (3) and the constitutional unit represented by Formula (6) in the polyorganosilsesquioxanes (a-1) and (a-2). $X^3$ in Formula (c) is, independently in each occurrence, selected from alkoxy and halogen. $X^3$ is exemplified as with $X^1$. In particular, $X^3$ is preferably selected from alkoxys, and more preferably selected from methoxy and ethoxy. The three occurrences of $X^3$ may be identical to or different from one another.

The hydrolyzable silane compound(s) for use herein may further include one or more hydrolyzable silane compounds other than the compounds represented by Formulae (a), (b), and (c). Non-limiting examples of the other hydrolyzable silane compounds include hydrolyzable trifunctional silane compounds other than the compounds represented by Formulae (a), (b) and (c), hydrolyzable monofunctional silane compounds to form M units, hydrolyzable bifunctional silane compounds to form D units, and hydrolyzable tetrafunctional silane compounds to form Q units.

The amounts and formula (proportions) of the hydrolyzable silane compounds may be adjusted as appropriate according to the desired structures of the polyorganosilsesquioxanes (a-1) and (a-2). For example, the amount of the compound represented by Formula (a) is not limited, but is preferably 55 to 100 mole percent, more preferably 65 to 100 mole percent, and furthermore preferably 80 to 99 mole percent, of the total amount (100 mole percent) of the hydrolyzable silane compound(s) to be used.

The amount of the compound represented by Formula (b) is not limited, but is preferably 0 to 70 mole percent, more preferably 0 to 60 mole percent, furthermore preferably 0 to 40 mole percent, and particularly preferably 1 to 15 mole percent, of the total amount (100 mole percent) of hydrolyzable silane compound(s) to be used.

The total proportion (proportion of total amount) of the compound represented by Formula (a) and the compound represented by Formula (b) is not limited, but is preferably 60 to 100 mole percent, more preferably 70 to 100 mole percent, and furthermore preferably 80 to 100 mole percent, of the total amount (100 mole percent) of hydrolyzable silane compound(s) to be used.

When two or more different hydrolyzable silane compounds are used in combination, the reactions of hydrolysis and condensation of these hydrolyzable silane compounds may be performed simultaneously or sequentially. The reactions, when performed sequentially, may be performed in any sequence not limited.

The hydrolysis and condensation of the hydrolyzable silane compound(s) may be performed in the presence of, or in the absence of, a solvent. In particular, the hydrolysis and condensation is preferably performed in the presence of a solvent. Non-limiting examples of the solvent include aromatic hydrocarbons such as benzene, toluene, xylenes, and ethylbenzene; ethers such as diethyl ether, dimethoxyethane, tetrahydrofuran, and dioxane; ketones such as acetone, methyl ethyl ketone, and methyl isobutyl ketone; esters such as methyl acetate, ethyl acetate, isopropyl acetate, and butyl acetate; amides such as N,N-dimethylformamide and N,N-dimethylacetamide; nitriles such as acetonitrile, propionitrile, and benzonitrile; and alcohols such as methanol, ethanol, isopropyl alcohol, and butanol. The solvent for use herein is preferably selected from ketones and ethers. Each of different solvents may be used alone or in combination.

The amount of the solvent is not limited and may be adjusted as appropriate according typically to the reaction time, within the range of 0 to 2000 parts by weight per 100 parts by weight of the total amount of the hydrolyzable silane compound(s).

The hydrolysis and condensation of the hydrolyzable silane compound(s) is preferably allowed to proceed in the presence of a catalyst and water. The catalyst may be either of an acid catalyst and an alkaline catalyst. Non-limiting examples of the acid catalyst include mineral acids such as hydrochloric acid, sulfuric acid, nitric acid, phosphoric acid, and boric acid; phosphoric esters; carboxylic acids such as acetic acid, formic acid, and trifluoroacetic acid; sulfonic acids such as methanesulfonic acid, trifluoromethanesulfonic acid, and p-toluenesulfonic acid; solid acids such as activated clay; and Lewis acids such as iron chloride. Non-limiting examples of the alkaline catalyst include alkali metal hydroxides such as lithium hydroxide, sodium hydroxide, potassium hydroxide, and cesium hydroxide; alkaline earth metal hydroxides such as magnesium hydroxide, calcium hydroxide, and barium hydroxide; alkali metal carbonates such as lithium carbonate, sodium carbonate, potassium carbonate, and cesium carbonate; alkaline earth metal carbonates such as magnesium carbonate; alkali metal hydrogencarbonates such as lithium hydrogencarbonate, sodium hydrogencarbonate, potassium hydrogencarbonate, and cesium hydrogencarbonate; alkali metal organic acid salts such as lithium acetate, sodium acetate, potassium acetate, and cesium acetate, of which acetates are typified; alkaline earth metal organic acid salts such as magnesium acetate, of which acetates are typified; alkali metal alkoxides such as lithium methoxide, sodium methoxide, sodium ethoxide, sodium isopropoxide, potassium ethoxide, and potassium t-butoxide; alkali metal phenoxides such as sodium phenoxide; amines such as triethylamine, N-methylpiperidine, 1,8-diazabicyclo[5.4.0]undec-7-ene, and 1,5-diazabicyclo[4.3.0]non-5-ene, of which tertiary amines are typified; and nitrogen-containing heteroaromatic compounds such as pyridine, 2,2'-bipyridyl, and 1,10-phenanthroline. Each of different catalysts may be used alone or in combination. The catalysts may also be used in the form of solution or dispersion as dissolved or dispersed in water and/or a solvent.

The amount of the catalyst is not limited and may be adjusted as appropriate within the range of 0.002 to 0.200 mole per mole of the total amount of the hydrolyzable silane compound(s).

The amount of the water in the hydrolysis and condensation is not limited and may be adjusted as appropriate within the range of 0.5 to 20 moles per mole of the total amount of the hydrolyzable silane compound(s).

The water may be added in any manner not limited and may be added collectively in the whole quantity (total amount to be used), or sequentially. The water, when added non-collectively, may be added continuously or intermittently.

It is important to select, in particular, reaction conditions for the hydrolysis and condensation of the hydrolyzable silane compound(s) so that the resulting polyorganosilsesquioxanes (a-1) and (a-2) each have a T3 to T2 ratio of 5 or more. The reaction temperature of the hydrolysis and condensation is not limited, but preferably 40° C. to 100° C., and more preferably 45° C. to 80° C. The hydrolysis and condensation, when performed at a reaction temperature controlled within the range, tends to enable more efficient control of the T3 to T2 ratio to 5 or more. The reaction time of the hydrolysis and condensation is not limited, but preferably 0.1 to 10 hours, and more preferably 1.5 to 8 hours. The hydrolysis and condensation may be performed at normal atmospheric pressure, under pressure (under a load), or under reduced pressure. The hydrolysis and condensation may be performed in any of atmospheres exemplified typically by inert gas atmospheres such as nitrogen atmosphere and argon atmosphere; and atmospheres in the presence of oxygen, such as air atmosphere. However, the hydrolysis and condensation is preferably performed in an inert gas atmosphere.

The hydrolysis and condensation of the hydrolyzable silane compound(s) gives the polyorganosilsesquioxanes (a-1) and (a-2). After the completion of the hydrolysis and condensation, the catalyst is preferably neutralized so as to restrain the ring-opening of epoxy groups. The resulting polyorganosilsesquioxanes (a-1) and (a-2) may be separated/purified typically by a separation method such as water washing, acid washing, alkali washing, filtration, concentration, distillation, extraction, crystallization, recrystallization, or column chromatography, or by a separation method as any combination of them.

The polyorganosilsesquioxanes (A) may be produced by independently producing the polyorganosilsesquioxanes (a-1) and (a-2) via control of molecular weights upon hydrolysis and condensation, and mixing these polyorganosilsesquioxanes; or may be produced by performing hydrolysis and condensation to give polyorganosilsesquioxanes, fractionating these polyorganosilsesquioxanes into fractions corresponding to the polyorganosilsesquioxanes (a-1) and (a-2), and mixing the fractions with each other.

Curable Composition

The curable composition according to the present invention includes the polyorganosilsesquioxanes (A) as an essential component. The curable composition according to the present invention may further include one or more other components. Non-limiting examples of the other components include other curable compounds; polymerization initiators (in particular, cationic-polymerization initiators) and polymerization stabilizers; and surface conditioners or surface modifiers, where the term "other curable compounds" refers to curable compounds other than the polyorganosilsesquioxanes (A).

The curable composition according to the present invention may contain the polyorganosilsesquioxanes (A) in a content (proportion) not limited, but preferably from 70 weight percent to less than 100 weight percent, more preferably 80 to 99.8 weight percent, and furthermore preferably 90 to 99.5 weight percent, of the total amount (100 weight percent) of the curable composition excluding solvent. The curable composition, when containing the polyorganosilsesquioxanes (A) in a content of 70 weight percent or more, tends to allow the cured product to have still better heat resistance.

The polyorganosilsesquioxanes (A) may be present in a proportion not limited, but preferably 70 to 100 weight percent, more preferably 75 to 100 weight percent, and furthermore preferably 80 to 100 weight percent, of the total amount (100 weight percent) of all curable compounds contained in the curable composition according to the present invention. The curable composition, when containing the polyorganosilsesquioxanes (A) in a content (proportion) of 70 weight percent or more, tends to allow the cured product to have still better heat resistance.

The polyorganosilsesquioxane (a-1) may be present in the curable composition according to the present invention in a content (proportion) of typically from 5 weight percent to less than 70 weight percent, preferably 10 to 60 weight percent, and particularly preferably 20 to 55 weight percent, of the total amount (100 weight percent) of the curable composition excluding solvent.

The polyorganosilsesquioxane (a-1) may be present in a proportion of typically 10 to 70 weight percent (preferably 10 to 65 weight percent, and particularly preferably 20 to 60 weight percent) of the total amount (100 weight percent) of all curable compounds contained in the curable composition according to the present invention.

The polyorganosilsesquioxane (a-2) in the curable composition according to the present invention may be present in a content (proportion) of typically from 25 weight percent to less than 90 weight percent, preferably 30 to 85 weight percent, and particularly preferably 35 to 75 weight percent, of the total amount (100 weight percent) of the curable composition excluding solvent.

The polyorganosilsesquioxane (a-2) may be present in a proportion of typically 30 to 90 weight percent, preferably 35 to 85 weight percent, and particularly preferably 40 to 75 weight percent, of the total amount (100 weight percent) of all curable compounds contained in the curable composition according to the present invention.

Polymerization Initiators

The polymerization initiators include cationic-polymerization initiators and anionic-polymerization initiators. The cationic-polymerization initiators are compounds that generate cationic species upon heating to initiate curing reactions of curable compounds. The anionic-polymerization initiators are compounds that generate anionic species upon heating to initiate curing reactions of curable compounds. The curable composition according to the present invention, when containing such a polymerization initiator, can be cured within a shorter curing time, where the curing time is necessary for the resulting cured product to become tack-free. The curable composition may contain each of different polymerization initiators alone or in combination.

The present invention preferably employs any of polymerization initiators having after-mentioned curing properties. This is preferred because as follows. The curable composition, when containing a polymerization initiator of this type, can rapidly form an adhesive layer by heating/drying, approximately without the progress of curing reactions. In addition, the resulting adhesive layer has characteristic properties as follows. At temperatures lower than 50° C., the adhesive layer offers approximately no adhesiveness, and this allows cutting to be performed without adhesive deposition on cutting blades. Upon heating at such a temperature as to less damage adherends, the adhesive layer develops adhesiveness and is thereafter rapidly cured to become tack-free.

Specifically, a cationic-polymerization initiator, when to be used, is preferably such a polymerization initiator that gives a composition having a thermal curing time of 3.5 minutes or longer (typically 3.5 to 7.0 minutes, and preferably 4.5 to 6.0 minutes) at 130° C., where the composition results from adding 1 part by weight of the cationic-polymerization initiator to 100 parts by weight of 3,4-epoxycyclohexylmethyl (3,4-epoxy)cyclohexane carboxylate (such as CELLOXIDE 2021P (trade name, supplied by Daicel Corporation)).

An anionic-polymerization initiator, when to be used, is preferably a polymerization initiator that gives a composition having a thermal curing time of 3.5 minutes or longer at 130° C., where the composition results from adding 1 part by weight of the anionic-polymerization initiator to 100 parts by weight of bisphenol-A diglycidyl ether.

As used herein, the term "thermal curing time" refers to a time (duration) necessary for the composition to become rubbery upon heating on a hot plate (more specifically, a time necessary for the composition to undergo curing progress to thereby become unliftable as a thread from the needlepoint of the measuring needle), where the time is determined in accordance with JIS K 5909:1994. The curable composition, when employing a polymerization initiator that gives a composition having a thermal curing time shorter than the range, generates cationic species in the case of a cationic-polymerization initiator, or generates anionic species in the case of an anionic-polymerization initiator upon heating/drying, and this may cause polymerization to proceed gradually after the heating/drying even at room temperature and may impede the formation of an adhesive layer having storage stability.

The cationic-polymerization initiators each include a cationic moiety and an anionic moiety. The cationic moiety absorbs heat, and the anionic moiety acts as an acid source. Examples of the cationic-polymerization initiators include, but are not limited to, arylsulfonium salts, aryliodonium salts, arene-ion complexes, quaternary ammonium salts, aluminum chelates, and boron trifluoride amine complexes. Among them, arylsulfonium salts are preferred herein, from the viewpoint of curing rate.

Non-limiting examples of the cationic moieties in the arylsulfonium salts include arylsulfonium ions such as (4-hydroxyphenyl)methylbenzylsulfonium ions, triphenylsulfonium ions, diphenyl[4-(phenylthio)phenyl]sulfonium ions, 4-(4-biphenylylthio)phenyl-4-biphenylylphenylsulfonium ions, and tri-p-tolylsulfonium ions, of which triarylsulfonium ions are typified.

Non-limiting examples of the anionic moieties in the arylsulfonium salts include $SbF_6^-$, $PF_6^-$, $BF_4^-$, $(CF_3CF_2)_3PF_3^-$, $(CF_3CF_2CF_2)_3PF_3^-$, $(C_6F_5)_4B^-$, $(C_{6F})_4Ga^-$, sulfonate anions (such as trifluoromethanesulfonate anions, pentafluoroethanesulfonate anions, nonafluorobutanesulfonate anions, methanesulfonate anions, benzenesulfonate anions, and p-toluenesulfonate anions), $(CF_3SO_2)_3C^-$, $(CF_3SO_2)_2N^-$, perhalogen acid ions, halogenated sulfonate ions, sulfate ions, carbonate ions, aluminate ions, hexafluorobismuthate ions, carboxylate ions, arylborate ions, thiocyanate ions, and nitrate ions.

The cationic-polymerization initiator for use herein may be selected from commercial products available typically under the trade names of SP-66 and SP-77 (each from ADEKA CORPORATION); and under the trade names of San-Aid SI-60L, San-Aid SI-80L, San-Aid SI-100L, and San-Aid SI-150L (each from SANSHIN CHEMICAL INDUSTRY CO., LTD.).

Non-limiting examples of the anionic-polymerization initiators include primary amines, secondary amines, tertiary amines, imidazoles, and boron trifluoride-amine complexes. Non-limiting examples of the imidazoles include 2-ethyl-4-methylimidazole, 2-phenylimidazole, 1-(2-cyanoethyl)-2-ethyl-4-methylimidazole, 2,4-diamino-6-[2-methylimidazolyl-(1)]ethyl-s-triazine, 2-phenylimidazoline, 2,3-dihydro-1H-pyrrolo[1,2-a]benzimidazole, 1-cyanoethyl-2-methylimidazole, and 1-cyanoethyl-2-undecylimidazole. Non-limiting examples of the tertiary amines include tris(dimethylaminomethyl)phenol, benzyldimethylamine, and 1,8-diazabicyclo[5.4.0]undecene-7 (DBU).

In view of curing rate, the polymerization initiator for use in the present invention is preferably selected from cationic-polymerization initiators, particularly preferably selected from cationic thermal initiators, and most preferably selected from arylsulfonium salts.

The content (proportion) of the polymerization initiator in the curable composition according to the present invention is not limited, but preferably 0.01 to 3.0 parts by weight, more preferably 0.05 to 2.0 parts by weight, furthermore preferably 0.1 to 1.0 part by weight, and particularly preferably 0.3 to 0.8 part by weight, per 100 parts by weight of curable compounds contained in the curable composition according to the present invention. The curable composition, when containing the polymerization initiator in a content of 0.01 part by weight or more, tends to allow the curing reaction to proceed efficiently and tends to allow the cured product to have still better heat resistance. The curable composition, when containing the polymerization initiator in a content of 3.0 parts by weight or less, tends to have still better storage stability and/or to allow the cured product to resist coloring.

Polymerization Stabilizer

The polymerization stabilizers are compounds that trap cations to restrain cationic polymerization from proceeding. Upon heating, the polymerization stabilizers are saturated in, and lose their cation trapping abilities. Assume that the curable composition according to the present invention contains a polymerization stabilizer in combination with a cationic-polymerization initiator. This curable composition, when applied and dried, can form an adhesive layer which resists polymerization progress over a long term after its formation, which offers excellent adhesiveness by heating timely when adhesiveness is required, and which has excellent storage stability (long pot life).

Non-limiting examples of the polymerization stabilizers include hindered amine compounds such as bis(2,2,6,6-tetramethyl-4-piperidyl) sebacate, poly([6-(1,1,3,3-tetramethylbutyl)imino-1,3,5-triazine-2,4-diyl][(2,2,6,6-tetramethyl-4-piperidyl)imino]hexamethylene[(2,2,6,6-tetramethyl-4-piperidyl)imino]), tetrakis(2,2,6,6-tetramethyl-4-piperidyl) butane-1,2,3,4-tetracarboxylate, 2,2,6,6-tetramethyl-4-piperidinyl benzoate, (mixed 2,2,6,6-tetramethyl-4-piperidyl/tridecyl) 1,2,3,4-butanetetracarboxylate, 3,9-bis(2,3-di-t-butyl-4-methylphenoxy)-2,4,8,10-tetraoxa-3,9-diphosphaspiro[5.5]undecane, mixed (2,2,6,6-tetramethyl-4-piperidyl/β,β,β',β'-tetramethyl-3,9-[2,4,8,10-tetraoxaspiro[5.5]undecane]diethyl) 1,2,3,4-butanetetracarboxylate, poly([6-N-morpholyl-1,3,5-triazine-2,4-diyl][(2,2,6,6-tetramethyl-4-piperidyl)imino]hexamethylene[(2,2,6,6-tetramethyl-4-piperidyl)imino]), [N-(2,2,6,6-tetramethyl-4-piperidyl)-2-methyl-2-(2,2,6,6-tetramethyl-4-piperidyl)imino]propionamide, trade names LA-77, LA-67, and LA-57 (each supplied by ADEKA CORPORATION), and trade names TINUVIN 123 and TINUVIN 152 (each supplied by Ciba Japan K.K.); sulfonium sulfate compounds such as (4-hydroxyphenyl)dimethylsulfonium methylsulfite (Auxiliary for San-Aid SI series, supplied by SANSHIN CHEMICAL INDUSTRY CO., LTD.); and phosphite compounds such as trade name PEP-36 (supplied by ADEKA CORPORATION). The curable composition may contain each of them alone or in combination.

Assume that the curable composition according to the present invention contains a cationic-polymerization initiator. This curable composition may contain the polymerization stabilizer in an amount of typically 1 part by weight or more, preferably 3 to 20 parts by weight, and particularly preferably 5 to 15 parts by weight, per 100 parts by weight of the cationic-polymerization initiator.

Other Curable Compounds

The other curable compounds for use herein may be selected from known or common curable compounds, are not limited, but are exemplified typically by other epoxy compounds; oxetane compounds; and vinyl ether compounds, where the term "other epoxy compounds" refers to epoxy compounds other than the polyorganosilsesquioxanes (A). The curable composition may contain each of them alone or in combination.

The other epoxy compounds for use herein may be selected from known or common compounds containing one or more epoxy groups (oxirane rings) in a molecule, are not limited, but are exemplified typically by cycloaliphatic epoxy compounds (cycloaliphatic epoxy resins), aromatic epoxy compounds (aromatic epoxy resins), and aliphatic epoxy compounds (aliphatic epoxy resins).

The cycloaliphatic epoxy compounds may be selected from known or common compounds containing one or more alicycles and one or more epoxy groups in a molecule, are not limited, but are exemplified typically by following compounds (1), (2), and (3):
(1) compounds containing an a cycloaliphatic epoxy group in a molecule, where the "cycloaliphatic epoxy group" refers to an epoxy group containing an oxygen atom bonded to two adjacent carbon atoms constituting an alicycle, and where a non-limiting example of the cycloaliphatic epoxy group is a cyclohexene oxide group;
(2) compounds containing an alicycle and an epoxy group bonded to the alicycle directly through a single bond; and
(3) compounds containing an alicycle and a glycidyl ether group in a molecule (glycidyl ether epoxy compounds).

Non-limiting examples of the compounds (1) containing a cycloaliphatic epoxy group in a molecule include compounds represented by Formula (i):

[Chem. 4]

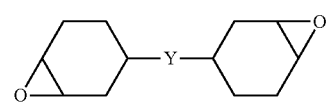
(i)

In Formula (i), Y is selected from a single bond and a linkage group (a divalent group containing one or more atoms). Non-limiting examples of the linkage group include divalent hydrocarbon groups, alkenylenes with part or all of carbon-carbon double bond(s) being epoxidized, carbonyl, ether bond, ester bond, carbonate group, amido, and groups each including two or more of these groups linked to each other.

Examples of the divalent hydrocarbon groups include, but are not limited to, $C_1$-$C_{18}$ linear or branched alkylenes and $C_3$-$C_{18}$ divalent alicyclic hydrocarbon groups. Non-limiting examples of the $C_1$-$C_{18}$ linear or branched alkylenes include methylene, methylmethylene, dimethylmethylene, ethylene, propylene, and trimethylene. Non-limiting examples of the $C_3$-$C_{18}$ divalent alicyclic hydrocarbon groups include cycloalkylenes (including cycloalkylidenes), such as 1,2-cyclopentylene, 1,3-cyclopentylene, cyclopentylidene, 1,2-cyclohexylene, 1,3-cyclohexylene, 1,4-cyclohexylene, and cyclohexylidene.

The alkenylenes with part or all of carbon-carbon double bond(s) being epoxidized are hereinafter also referred to as "epoxidized alkenylenes". Non-limiting examples of alkenylenes from which the epoxidized alkenylenes are derived include $C_2$-$C_8$ linear or branched alkenylenes such as vinylene, propenylene, 1-butenylene, 2-butenylene, butadienylene, pentenylene, hexenylene, heptenylene, and octenylene. Of the epoxidized alkenylenes, preferred are alkenylenes with all of carbon-carbon double bond(s) being epoxidized, and more preferred are $C_2$-$C_4$ alkenylenes with all of carbon-carbon double bond(s) being epoxidized.

Representative, but non-limiting examples of the cycloaliphatic epoxy compounds represented by Formula (i) include (3,4,3',4'-diepoxy)bicyclohexyl, bis(3,4-epoxycyclohexylmethyl) ether, 1,2-epoxy-1,2-bis(3,4-epoxycyclohex-1-yl)ethane, 2,2-bis(3,4-epoxycyclohex-1-yl)propane, 1,2-bis(3,4-epoxycyclohex-1-yl)ethane, and compounds represented by Formulae (i-1) to (i-10) below. In Formula (i-5), R' represents, independently in each occurrence, $C_1$-$C_3$ alkylene, and is preferably selected, in particular, from $C_1$-$C_3$ linear or branched alkylenes such as methylene, ethylene, propylene, and isopropylene. In Formulae (i-5), (i-7), (i-9), and (i-10), $n^1$ to $n^8$ each independently represent an integer from 1 to 30. Formulae (i-1) to (i-10) are expressed as follows:

[Chem. 5]

(i-1)

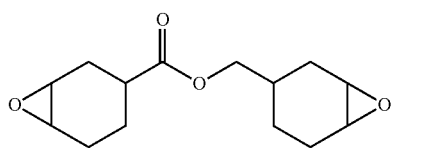

(i-2)

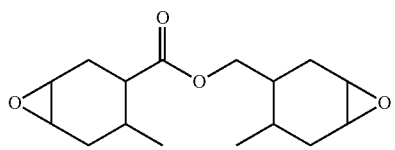

(i-3)

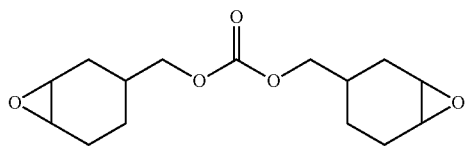

(i-4)

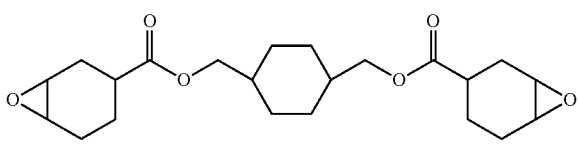

(i-5)

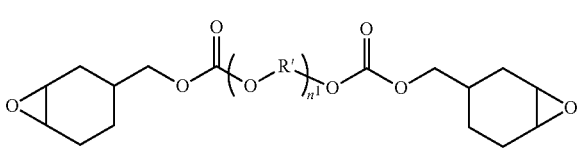

(i-6)

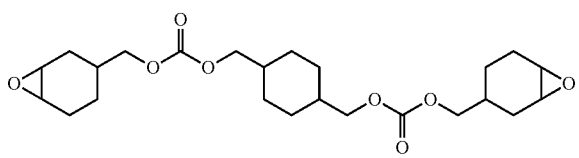

(i-7)

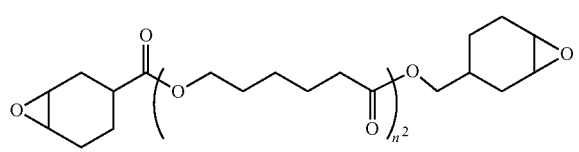

(i-8)

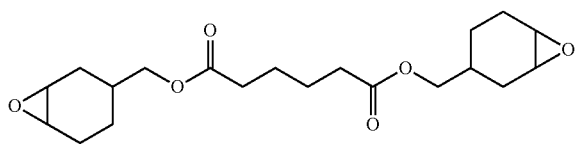

[Chem. 6]

(i-9)

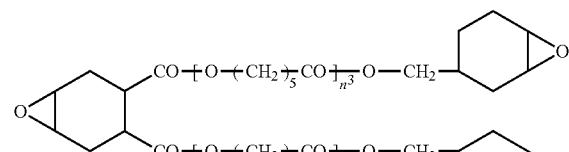

(i-10)

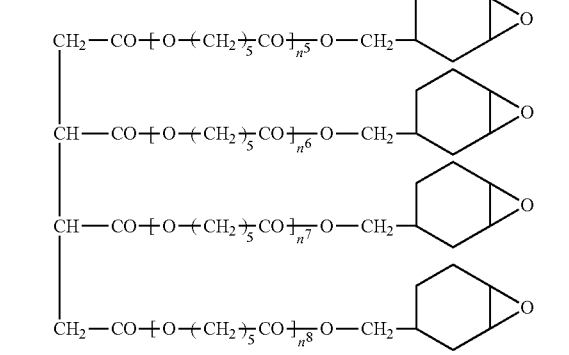

Non-limiting examples of the compounds (2) containing an alicycle, and an epoxy group bonded to the alicycle directly through a single bond include compounds represented by Formula (ii):

[Chem. 7]

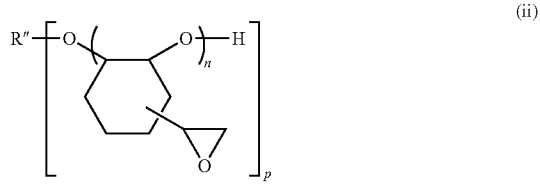

In Formula (ii), R" represents a group (p-valent organic group) resulting from removing "p" hydroxy groups (—OH) from the structural formula of a p-hydric alcohol; and p and n each independently represent a natural number. Non-limiting examples of the p-hydric alcohol (R"(OH)$_p$) include polyhydric alcohols such as 2,2-bis(hydroxymethyl)-1-butanol, of which $C_1$-$C_{15}$ alcohols are typified. The number p is preferably 1 to 6, and n is preferably 1 to 30. When p is 2 or more, the "p" occurrences of n in the groups in the brackets (outer brackets) may be identical or different. Specifically, a non-limiting example of the compounds represented by Formula (ii) is a 1,2-epoxy-4-(2-oxiranyl)cyclohexane adduct of 2,2-bis(hydroxymethyl)-1-butanol, such as EHPE 3150 (trade name, supplied by Daicel Corporation).

Examples of the compounds (3) containing an alicycle and a glycidyl ether group in a molecule include, but are not limited to, glycidyl ethers of alicyclic alcohols (in particular, of alicyclic polyhydric alcohols). More specifically, non-limiting examples of the compounds (3) include hydrogenated bisphenol-A epoxy compounds, which are compounds resulting from hydrogenating bisphenol-A epoxy compounds, such as 2,2-bis[4-(2,3-epoxypropoxy)cyclohexyl]propane and 2,2-bis[3,5-dimethyl-4-(2,3-epoxypropoxy)cyclohexyl]propane; hydrogenated bisphenol-F epoxy compounds, which are compounds resulting from hydrogenating bisphenol-F epoxy compounds, such as bis[o,o-(2,3-epoxypropoxy)cyclohexyl]methane, bis[o,p-(2,3-epoxypropoxy)cyclohexyl]methane, bis[p,p-(2,3-epoxypropoxy)cyclohexyl]methane, and bis[3,5-dimethyl-4-(2,3-epoxypropoxy) cyclohexyl]methane; hydrogenated biphenol epoxy compounds; hydrogenated phenol novolac epoxy compounds; hydrogenated cresol novolac epoxy compounds; hydrogenated cresol novolac epoxy compounds derived from bisphenol-A; hydrogenated naphthalene epoxy compounds; compounds resulting from hydrogenating epoxy compounds derived from trisphenolmethane; and compounds resulting from hydrogenating undermentioned aromatic epoxy compounds.

Non-limiting examples of the aromatic epoxy compounds include epi-bis glycidyl ether epoxy resins resulting from condensing bisphenols with epihalohydrins, where the bisphenols are exemplified typically by bisphenol-A, bisphenol-F, bisphenol-S, and fluorene bisphenol; high-molecular-weight epi-bis glycidyl ether epoxy resins resulting from further subjecting these epi-bis glycidyl ether epoxy resins to addition reactions with the bisphenols; novolac alkyl glycidyl ether epoxy resins resulting from condensing phenols with aldehydes to give polyhydric alcohols, and further condensing these polyhydric alcohols with epihalohydrins, where the phenols are exemplified typically by phenol, cresols, xylenols, resorcinol, catechol, bisphenol-A, bisphenol-F, and bisphenol-S, and the aldehydes are exemplified typically by formaldehyde, acetaldehyde, benzaldehyde, hydroxybenzaldehyde, and salicylaldehyde; and epoxy compounds each containing a fluorene ring and two phenolic skeletons bonded at the 9-position of the fluorene ring and containing glycidyl groups bonded, directly or through alkyleneoxy, to oxygen atoms, where the oxygen atoms result from removing hydrogen atoms from the hydroxy groups of the phenolic skeletons.

Non-limiting examples of the aliphatic epoxy compounds include glycidyl ethers of q-hydric alcohols devoid of cyclic structures, where q is a natural number; glycidyl esters of monovalent or multivalent carboxylic acids such as acetic acid, propionic acid, butyric acid, stearic acid, adipic acid, sebacic acid, maleic acid, and itaconic acid; epoxidized derivatives of double-bond-containing fats and oils, such as epoxidized linseed oils, epoxidized soybean oils, and epoxidized castor oils; and epoxidized derivatives of polyolefins (including polyalkadienes), such as epoxidized polybutadienes. Non-limiting examples of the q-hydric alcohols devoid of cyclic structures include monohydric alcohols such as methanol, ethanol, 1-propyl alcohol, isopropyl alcohol, and 1-butanol; dihydric alcohols such as ethylene glycol, 1,2-propanediol, 1,3-propanediol, 1,4-butanediol, neopentyl glycol, 1,6-hexanediol, diethylene glycol, triethylene glycol, tetraethylene glycol, dipropylene glycol, polyethylene glycols, and polypropylene glycols; and trihydric or higher polyhydric alcohols such as glycerol, diglycerol, erythritol, trimethylolethane, trimethylolpropane, pentaerythritol, dipentaerythritol, and sorbitol. The q-hydric alcohol may also be selected typically from polyether polyols, polyester polyols, polycarbonate polyols, and polyolefin polyols.

The oxetane compounds may be selected from known or common compounds containing one or more oxetane rings in a molecule, are not limited, but are exemplified typically by 3,3-bis(vinyloxymethyl)oxetane, 3-ethyl-3-(hydroxymethyl)oxetane, 3-ethyl-3-(2-ethylhexyloxymethyl)oxetane, 3-ethyl-3-[(phenoxy)methyl]oxetane, 3-ethyl-3-(hexyloxymethyl)oxetane, 3-ethyl-3-(chloromethyl)oxetane, 3,3-bis(chloromethyl)oxetane, 1,4-bis[(3-ethyl-3-oxetanylmethoxy)methyl]benzene, bis{[1-ethyl(3-oxetanyl)]methyl} ether, 4,4'-bis[(3-ethyl-3-oxetanyl)methoxymethyl]bicyclohexyl, 1,4-bis[(3-ethyl-3-oxetanyl)methoxymethyl] cyclohexane, 1,4-bis{[(3-ethyl-3-oxetanyl)methoxy]methyl}benzene, 3-ethyl-3-([(3-ethyloxetan-3-yl)methoxy]methyl}}oxetane, xylylene-bisoxetanes, 3-ethyl-3-{[3-(triethoxysilyl)propoxy]methyl}oxetane, oxetanylsilsesquioxanes, and phenol novolac oxetanes.

The vinyl ether compounds for use herein may be selected from known or common compounds containing one or more vinyl ether groups in a molecule, are not limited, but are exemplified typically by 2-hydroxyethyl vinyl ether (ethylene glycol monovinyl ether), 3-hydroxypropyl vinyl ether, 2-hydroxypropyl vinyl ether, 2-hydroxyisopropyl vinyl ether, 4-hydroxybutyl vinyl ether, 3-hydroxybutyl vinyl ether, 2-hydroxybutyl vinyl ether, 3-hydroxyisobutyl vinyl ether, 2-hydroxyisobutyl vinyl ether, 1-methyl-3-hydroxypropyl vinyl ether, 1-methyl-2-hydroxypropyl vinyl ether, 1-hydroxymethylpropyl vinyl ether, 4-hydroxycyclohexyl vinyl ether, 1,6-hexanediol monovinyl ether, 1,6-hexanediol divinyl ether, 1,8-octanediol divinyl ether, 1,4-cyclohexanedimethanol monovinyl ether, 1,4-cyclohexanedimethanol divinyl ether, 1,3-cyclohexanedimethanol monovinyl ether, 1,3-cyclohexanedimethanol divinyl ether, 1,2-cyclohexanedimethanol monovinyl ether, 1,2-cyclohexanedimethanol divinyl ether, p-xylene glycol monovinyl ether, p-xylene glycol divinyl ether, m-xylene glycol monovinyl ether, m-xylene glycol divinyl ether, o-xylene glycol monovinyl ether, o-xylene glycol divinyl ether, ethylene glycol divinyl ether, diethylene glycol monovinyl ether, diethylene glycol divinyl ether, triethylene glycol monovinyl ether, triethylene glycol divinyl ether, tetraethylene glycol monovinyl ether, tetraethylene glycol divinyl ether, pentaethylene glycol monovinyl ether, pentaethylene glycol divinyl ether, oligoethylene glycol monovinyl ethers, oligoethylene glycol divinyl ethers, polyethylene glycol monovinyl ethers, polyethylene glycol divinyl ethers, dipropylene glycol monovinyl ether, dipropylene glycol divinyl ether, tripropylene glycol monovinyl ether, tripropylene glycol divinyl ether, tetrapropylene glycol monovinyl ether, tetrapropylene glycol divinyl ether, pentapropylene glycol monovinyl ether, pentapropylene glycol divinyl ether, oligopropylene glycol monovinyl ethers, oligopropylene glycol divinyl ethers, polypropylene glycol monovinyl ethers, polypropylene glycol divinyl ethers, isosorbide divinyl ether, oxanorbornene divinyl ether, phenyl vinyl ether, n-butyl vinyl ether, isobutyl vinyl ether, octyl vinyl ether, cyclohexyl vinyl ether, hydroquinone divinyl ether, 1,4-butanediol divinyl ether, cyclohexanedimethanol divinyl ether, trimethylolpropane divinyl ether, trimethylolpropane trivinyl ether, bisphenol-A divinyl ether, bisphenol-F divinyl ether, hydroxyoxanorbornanemethanol divinyl ethers, 1,4-cyclohexanediol divinyl ether, pentaerythritol trivinyl ether, pentaerythritol tetravinyl ether, dipentaerythritol pentavinyl ether, and dipentaerythritol hexavinyl ether.

Of the vinyl ether compounds, vinyl ether compounds containing one or more hydroxy groups in a molecule, when used as the other curable compounds, advantageously give cured products that have excellent thermal yellowing resistance (such a property as to resist yellowing caused by heating). The number of hydroxy groups in a molecule of the vinyl ether compounds containing one or more hydroxy groups in a molecule is not limited, but preferably 1 to 4, and more preferably 1 or 2.

The content (proportion) of the other curable compound(s) in the curable composition according to the present invention is not limited, but preferably 50 weight percent or less (e.g., 0 to 50 weight percent), more preferably 30 weight percent or less (e.g., 0 to 30 weight percent), and furthermore preferably 10 weight percent or less (e.g., 0 to 10 weight percent), of the total amount (100 weight percent; total amount of all curable compounds) of the polyorganosilsesquioxanes (A) and the other curable compound(s). The incorporation of the other curable compound(s) in a proportion within the range may impart desired performance to the curable composition and/or to the cured product. For example, the incorporation may allow the curable composition to be rapidly curable and/or to have a controlled viscosity.

The curable composition according to the present invention may further include one or more types of common additives as needed. Non-limiting examples of the additives include fillers exemplified typically by inorganic fillers such as precipitated silica, hydrous silica (wet silica), fumed silica, pyrogenic silica, titanium oxide, alumina, glass, quartz, aluminosilicate, iron oxide, zinc oxide, calcium carbonate, carbon black, silicon carbide, silicon nitride, and boron nitride, as well as inorganic fillers resulting from treating these fillers with organosilicon compounds such as organohalosilanes, organoalkoxysilanes, and organosilazanes; fine powders of organic resins such as silicone resins, epoxy resins, and fluorocarbon resins; and conductive powders of metals such as silver and copper.

Non-limiting examples of the additives also include curing assistants; solvents such as organic solvents; stabilizers such as antioxidants, ultraviolet absorbers, photostabilizers, thermal stabilizers, and heavy-metal deactivators; flame retardants such as phosphorus flame retardants, halogen flame retardants, and inorganic flame retardants; flame retardant promoters; reinforcers such as other fillers; nucleating agents; coupling agents such as silane coupling agents; lubricants; waxes; plasticizers; release agents; impact modifiers; color modifiers (hue modifiers); clearing agents; rheology adjusters such as flow improvers; workability improvers; colorants such as dyes and pigments; antistatic agents; dispersants; surface conditioners such as leveling agents and anti-popping agents; surface modifiers such as slipping agents; delustering agents; antifoaming agents; foam inhibitors; defoaming agents; blowing agents; antimicrobial agents; antiseptic agents; viscosity modifiers; and thickeners.

The curable composition according to the present invention may be prepared typically, but non-limitingly, by stirring and mixing the components at room temperature, or with heating as needed. The curable composition according to the present invention may be used as a one-part composition, or a multi-part composition such as a two-part composition. The one-part composition contains the components, which have been blended beforehand, and is used as intact. In contrast, in the multi-part composition, two or more parts (portions) of the components are stored separately, and the two or more parts are blended in predetermined proportions before use.

The curable composition according to the present invention is preferably, but non-limitingly, liquid at room temperature (about 25° C.). The curable composition, when to be applied by spin coating, preferably has a viscosity as adjusted according to the resulting coat layer thickness. For example, the curable composition preferably has a viscosity of 1 to 5000 mPa·s when to be applied to a thickness of 0.1 to 50 μm. The curable composition, when having a viscosity within this range, can form a coat layer having a uniform thickness on a substrate such as a silicon wafer. The viscosity of the curable composition may be measured with a viscometer (trade name MCR 301, supplied by Anton Paar GmbH) at an oscillation angle of 5*, a frequency of 0.1 to 100 $s^{-1}$, and a temperature of 25° C.

Cured Product

The curable composition according to the present invention, when subjected to a heat treatment, undergoes the progress of the polymerization reaction of curable compounds in the curable composition and can form a cured product.

The curable composition according to the present invention contains the polyorganosilsesquioxanes (A) as curable compounds and can thereby rapidly form a cured product by heating at a low temperature of 200° C. or lower. Namely, the curable composition has low-temperature curability. The heating may be performed at a heating temperature of typically 30° C. to 200° C., and preferably 50° C. to 190° C., for a heating time which is settable as appropriate.

The cured product resulting from curing the curable composition according to the present invention has excellent cracking resistance and resists cracking even when receiving thermal shocks.

The cured product resulting from curing the curable composition according to the present invention also has excellent heat resistance and has a decomposition temperature of typically 200° C. or higher (e.g., 200° C. to 500° C.), and preferably 260° C. or higher. The decomposition temperature may be determined by the method described in the working examples.

The curable composition according to the present invention, when cured, gives a cured product that has heat resistance, cracking resistance, and adhesiveness and adhesion to an adherend at excellent levels. The curable composition according to the present invention is therefore advantageously usable as an adhesive, and particularly preferably usable as a thermosetting adhesive. The curable composition, when used as an adhesive, is also referred to as an "adhesive composition". The adhesive composition, when cured, can be converted into a binding material (adhesive material) that has heat resistance, cracking resistance, and adhesiveness and adhesion to an adherend at excellent levels.

The curable composition according to the present invention (adhesive composition) is usable not only in uses for preparing the after-mentioned adhesive sheet and stack, but also in various uses for bonding desired articles (such as parts or components) to each other.

Adhesive Sheet

The curable composition according to the present invention (adhesive composition), when used, gives an adhesive sheet according to the present invention. The adhesive sheet according to the present invention includes a substrate, and an adhesive layer on or over the substrate, where the adhesive layer is a layer of the curable composition according to the present invention. This adhesive layer is also referred to as an "adhesive layer according to the present invention". Examples of the form (shape) of the adhesive sheet according to the present invention include not only a sheet form (sheet-like form), but also forms analogous to the sheet form, such as film-like, tape-like, and plate-like forms.

The adhesive sheet according to the present invention may be obtained typically, but non-limitingly, by applying the curable composition according to the present invention to the substrate, and drying the applied layer as needed. The application may be performed by any method not limited and may be performed by a well-known, common method. The drying can also be performed by any method under any conditions not limited, and may be performed by a well-known, common method under conditions which are set so as to remove volatile components, such as solvents, as much as possible. In particular, assume that the curable composition according to the present invention contains a polymerization initiator giving a composition having a thermal curing time of 3.5 minutes or longer at 130° C., where the composition results from adding 1 part by weight of the polymerization initiator to 100 parts by weight of CELLOXIDE 2021P (supplied by Daicel Corporation). This curable composition can rapidly form an adhesive layer by heating/drying to remove volatile components such as solvents therefrom, but still less undergoes the progress of curing reaction. The resulting adhesive layer has characteristic properties as follows. At temperatures lower than 50° C., the adhesive layer offers approximately no adhesiveness and can be cut without adhesive deposition on cutting blades. Upon heating at such a temperature as to less damage adherends, the adhesive layer develops adhesiveness and is rapidly cured after the heating.

The adhesive sheet according to the present invention may be a single-sided adhesive sheet, which includes a substrate and an adhesive layer on or over only one side of the substrate; or a double-sided adhesive sheet, which includes a substrate and adhesive layers on or over both sides of the substrate. The adhesive sheet according to the present invention, when being a double-sided adhesive sheet, has only to include the adhesive layer according to the present invention as at least one of the two adhesive layers.

The substrate (base material) in the adhesive sheet according to the present invention may be selected from well-known, common substrates (substrates for use in adhesive sheets), is not limited, but is exemplified typically by plastic substrates, metal substrates, ceramic substrates, semiconductor substrates, glass substrates, paper substrates, wood substrates, and substrates having a coated surface. The substrate in the adhesive sheet according to the present invention may also be a so-called release liner. The adhesive sheet according to the present invention may include only one substrate, or two or more layers of a substrate or substrates. The thickness of the substrate is not limited and may be selected as appropriate typically within the range of 1 to 10000 μm.

The adhesive sheet according to the present invention may include only one adhesive layer according to the present invention, or two or more different adhesive layers according to the present invention. The thickness of the adhesive layer(s) according to the present invention is not limited and may be selected as appropriate typically within the range of 0.1 to 10000 μm. The same is true for another adhesive layer (adhesive layer other than the adhesive layers according to the present invention).

In addition to the substrate and the adhesive layer(s), the adhesive sheet according to the present invention may include one or more other layers such as intermediate layers and under coats.

Stack

The curable composition (adhesive composition) according to the present invention, when used, can give a stack according to the present invention. The stack according to the present invention is a stack (integrated stacked body) including three or more layers. The three or more layers include at least two adhesive layers, and a bonding layer (a layer that bonds the adherend layers to each other) disposed between the adherend layers. The bonding layer is a layer of a cured product of the curable composition according to the present invention. This bonding layer is also referred to as a "bonding layer according to the present invention". The stack according to the present invention may be obtained typically, but non-limitingly, by forming an adhesive layer according to the present invention on one adherend layer, laminating the other adherend layer onto the adhesive layer, and subjecting the resulting article to a heat treatment to cure the adhesive layer(s) according to the present invention. The adhesive layer according to the present invention can be formed typically by a procedure similar to that in the adhesive layer in the adhesive sheet according to the present invention. In this case that the adhesive sheet according to the present invention is a single-sided adhesive sheet, the stack according to the present invention may be obtained typically by applying the adhesive sheet according to the present invention to an adherend layer, and subjecting the resulting article to a heat treatment to cure the adhesive layer according to the present invention in the adhesive sheet. In the resulting stack in this case, the substrate in the adhesive sheet according to the present invention corresponds to the adherend layer. In this case that the adhesive sheet according to the present invention is a double-sided adhesive sheet that includes an adhesive layer and release liners disposed on both sides of the adhesive layer, where the release liners act as substrates, the stack according to the present invention may be obtained typically by removing one release liner from the adhesive sheet according to the present invention to expose one adhesive face of the adhesive layer, applying the adhesive face to an adherend layer, then removing the other release liner to expose the other adhesive face of the adhesive layer, applying or laminating the other adhesive face onto another adherend layer, and then subjecting the resulting article to a heat treatment to cure the adhesive layer according to the present invention. However, a method for producing the stack according to the present invention is not limited to these methods.

An adherend or adherends to constitute the adherend layers in the stack according to the present invention are not limited and are exemplified typically by plastic substrates, metal substrates, ceramic substrates, semiconductor substrates (typically including semiconductor chips and semiconductor wafers), glass substrates, paper substrates, wood substrates, and substrates having a coated surface. The stack according to the present invention may include only two adherend layers, or three or more adherend layers. The thickness of the adherend layers is not limited and may be selected as appropriate typically within the range of 1 to 100000 µm. The adherend layers do not have to be in a layer form according to the strict definition.

The stack according to the present invention may include only one bonding layer according to the present invention, or two or more bonding layers according to the present invention. The thickness of the bonding layer(s) according to the present invention is not limited, and may be selected as appropriate typically within the range of 0.1 to 10000 µm.

The stack according to the present invention may further include one or more layers other than the adherend layers and the bonding layers according to the present invention. Non-limiting examples of the other layers include intermediate layers, under coats, and other bonding layers.

The stack according to the present invention has the configuration in which adherends are bonded to each other through a bonding layer that has heat resistance, cracking resistance, and adhesiveness and adhesion to adherends at excellent levels. The stack according to the present invention resists cracking and delamination of the bonding layer, thereby eliminates or minimizes adherend separation and wiring (interconnection) fracture, and can form a device having high reliability. The stack according to the present invention, when being a three-dimensional stack of semiconductor chips, is more highly integrated and consumes less power as compared with conventional semiconductors. Accordingly, the stack according to the present invention, when used, can provide electronic devices that have more smaller sizes and still have higher performance.

Non-limiting examples of the stack according to the present invention include microprocessors, semiconductor memories, power source ICs, communication ICs, semiconductor sensors, MEMSs, and semiconductors each including two or more of them in combination. These are used typically in high-performance servers, workstations, on-vehicle computers, personal computers, telecommunication devices, photographing or shooting devices, and image display devices.

Accordingly, non-limiting examples of the device according to the present invention, which includes the stack (or which is equipped with the stack), include servers, workstations, on-vehicle computers, personal computers, telecommunication devices, photographing or shooting devices, and image display devices.

EXAMPLES

The present invention will be illustrated in further detail with reference to several examples below. It should be noted, however, that the examples are by no means intended to limit the scope of the present invention.

Weight-average molecular weights and molecular-weight dispersities of products were determined by GPC analysis under conditions as follows:

Measuring apparatus: HLC-8220 GPC (trade name, supplied by Tosoh Corporation)
Columns: three TSKgel SuperHZM-M columns (supplied by Tosoh Corporation)
Measurement temperature: 40° C.
Eluent: THF
Sample concentration: 0.1 to 0.2 weight percent
Flow rate: 0.6 mL/min.
Detector: RI detector (trade name HLC-8220 GPC, supplied by Tosoh Corporation)
Molecular weight: calibrated with a polystyrene standard
The T3 to T2 ratios, which are ratios of T3 species to T2 species, in the products were determined by $^{29}$Si-NMR spectrum measurement using JEOL ECA 500 (500 MHz).

Production Example 1

In a nitrogen stream, 161.5 mmol (39.79 g) of 2-(3,4-epoxycyclohexyl)ethyltrimethoxysilane, 9 mmol (1.69 g) of phenyltrimethoxysilane, and 165.9 g of acetone were charged into a 300-mL flask (reactor) equipped with a thermometer, a stirrer, a reflux condenser, and a nitrogen inlet tube, followed by temperature rise up to 50° C. To the mixture, 4.70 g (1.7 mmol in terms of potassium carbonate) of a 5% aqueous potassium carbonate solution were added dropwise over 5 minutes, and 1700 mmol (30.60 g) of water were further added dropwise over 20 minutes. Significant temperature rise did not occur during the dropwise additions. The resulting mixture was subjected to polycondensation in a nitrogen stream for 4 hours white the temperature was held at 50° C.

A product in a reaction solution after the polycondensation was analyzed and found to have a weight-average molecular weight of 2600 and a molecular-weight dispersity of 1.8. The product had a T3 to T2 ratio, which is a ratio of T3 species to T2 species, of 10.3 as calculated on the basis of a $^{29}$Si-NMR spectrum.

The reaction solution was then cooled, rinsed until a lower-layer liquid became neutral, from which an upper-layer liquid was isolated, followed by distilling off of the solvent at 40° C. and 1 mmHg to a solvent content of 25 weight percent. This gave a colorless, transparent, liquid product (unfractionated) (epoxy-containing polyorganosilsesquioxane).

Production Example 2

In a 500-mL Erlenmeyer flask housing a stirring bar, 75 g of the product obtained in Production Example 1 and 225 g of tetrahydrofuran (hereinafter simply referred to as THF) were placed and stirred, and yielded a THF solution.

An aliquot (300 g) of n-hexane was placed in a different 1-L eggplant flask housing a stirring bar, and combined with the THF solution added dropwise over 30 minutes using a dropping funnel. Simultaneously with the dropwise addition, components insoluble in n-hexane became cloudy to form a slurry, part of which was neither precipitated nor dissolved, but settled out as a lower layer.

These were separated using a separatory funnel and yielded 545 g of an upper-layer liquid and 55 g of a lower-layer liquid. The upper-layer liquid and the lower-layer liquid were each independently combined with 100 g of methyl isobutyl ketone (hereinafter simply referred to as MIBK), stirred, and thus converted into completely dissolved solutions. The resulting upper-layer liquid and lower-layer liquid were each concentrated at 50° C. and 1 mmHg to a solvent content of 25 weight percent. Thus, the upper layer gave 31 g of an MIBK solution of a colorless, transparent, liquid product (a-2) (epoxy-containing polyorganosilsesquioxane, having a weight-average molecular weight of 1600, a molecular-weight dispersity of 1.4, and a T3 to T2 ratio of 8.9); and the lower layer gave 44 g of an MIBK solution of a colorless, transparent, liquid product (a-1) (epoxy-containing polyorganosilsesquioxane, having a weight-average molecular weight of 3200, a molecular-weight dispersity of 1.7, and a T3 to T2 ratio of 13.3).

Example 1 (Preparation of Adhesive Composition)

Components were blended in the proportions (by weight) given in Table 1, were dissolved, and yielded an adhesive composition (1). The proportion of the polymerization initiator SI-150L is a proportion in terms of solids content.

Production of Adhesive Layer

A silane coupling agent (trade name KBE-403, supplied by Shin-Etsu Chemical Co., Ltd.) was applied onto a silicon plate (2 cm by 5 cm in size, prepared by dicing a 100-mm diameter silicon wafer supplied by SUMCO CORPORATION) by spin coating, heated at 120° C. for 5 minutes, and yielded a silicon plate with silane coupling agent layer.

The adhesive composition (1) was applied onto the silane coupling agent layer surface of the silicon plate with silane coupling agent layer by spin coating, heated at 80° C. for 4 minutes, and subsequently heated at 100° C. for 2 minutes to remove the residual solvent. This gave a silicon plate with adhesive layer (1). This article included the adhesive layer (1), the silane coupling agent layer, and the silicon plate disposed in this sequence. The adhesive layer (1) had a thickness of 5 to 6 μm.

The resulting silicon plate with adhesive layer (1) was heated at 130° C. for 30 minutes, subsequently heated at 170° C. for 30 minutes, and yielded a cured product. This article included a cured product (1), the silane coupling agent layer, and the silicon plate disposed in this sequence.

Production of Stack

A silane coupling agent (trade name KBE-403, supplied by Shin-Etsu Chemical Co., Ltd.) was applied onto a glass plate (4-inch, supplied by SCHOTT Nippon K.K.) by spin coating, heated at 120° C. for 5 minutes, and yielded a glass plate with silane coupling agent layer.

Under reduced pressure, the silane coupling agent layer surface of the resulting glass plate with silane coupling agent layer was aligned with (superimposed on) the adhesive layer (1) surface of a silicon plate with adhesive layer (1), which had been produced by a procedure similar to that in "Production of Adhesive Layer". The two articles were then attached to each other under a load of 200 g/cm$^2$ with heating at 60° C., the attached article was heated at 130° C. for 30 minutes, and subsequently heated at 170° C. for 30 minutes. This gave a stack (1) including the glass plate, the silane coupling agent layer, the bonding layer (1), the silane coupling agent layer, and the silicon plate disposed in this sequence.

Example 2 and Comparative Examples 1 to 4

Adhesive compositions, silicon plates with adhesive layer, cured products of the adhesive layers, and stacks were obtained by procedures similar to those in Example 1, except for employing adhesive compositions having the formulae given in Table 1. The cured products of the adhesive layers were each obtained as an article including the cured product, the silane coupling agent layer, and the silicon plate disposed in this sequence.

The cured products of adhesive layers, and the stacks obtained in the examples and comparative examples were evaluated in the following manner. The evaluation results are collectively given in the table.

Cracking Resistance

A thermal shock was applied to each cured product of the adhesive layer by heating at 250° C. for 30 minutes and then rapidly cooling down to room temperature, and the cracking resistance was evaluated according to criteria as follows:

Evaluation Criteria

Good: portions without cracking occupied 80% or more of the cured product;

Fair: portions without cracking occupied from 50% to less than 80% of the cured product; and Poor: portions without cracking occupied less than 50% of the cured product.

Heat Resistance

Each cured product of the adhesive layer was subjected to thermogravimetry using a thermal analyzer (trade name TG-DTA 6300, supplied by Seiko Instruments Inc.) in a nitrogen atmosphere at a rate of temperature rise of 10° C./minute to measure a decomposition temperature (T), on the basis of which the heat resistance was evaluated according to criteria as follows. The term "decomposition temperature (T)" refers to a temperature at which two tangent lines intersect with each other, as illustrated in FIG. 1, where one of the two tangent lines is a tangent line of the curve in a region with no or gradual weight loss in early stages of heating (the region "A" in the FIGURE), and the other is a tangent line of the inflection point of the curve in a region with abrupt weight loss (the region "B" in the FIGURE).

Evaluation Criteria

Good (good heat resistance): having a decomposition temperature (T) of 260° C. or higher; and Poor (poor heat resistance): having a decomposition temperature (T) of lower than 260° C.

Adhesiveness

A razor blade (trade name Single-edged Razor Blade for Trimming, supplied by Nisshin EM Co., Ltd.) was inserted into the adhesive interface of each stack, and the adhesiveness was evaluated according to criteria as follows:

Evaluation Criteria

Good (good adhesiveness): no delamination occurred at the adhesive interface; and Poor (poor adhesiveness): delamination occurred at the adhesive interface.

Adhesion

Each cured product of the adhesive layer (including the cured product, the silane coupling agent layer, and the silicon plate disposed in this sequence) was subjected to a cross-cut test (in accordance with JIS K 5400-8.5), and the adhesion of the cured product to the silicon plate was evaluated according to criteria as follows:

Evaluation Criteria

Good (good adhesion): no separation of the cured product occurred; and

Poor (poor adhesion): separation of the cured product occurred.

Film-Formability

The cured product surface of each cured product of adhesive layer (including the cured product, the silane coupling agent layer, and the silicon plate disposed in this sequence) was visually observed, and the film-formability was evaluated according to criteria as follows. The "crawling" includes both pitting such that the silicon plate surface is exposed, and cratering, which does not reach the silicon plate surface.

Evaluation Criteria

Excellent: no crawling;

Good: having from 1 to less than 50 crawling defects having a diameter of 1 mm or more; and Poor: having 50 or more crawling defects having a diameter of 1 mm or more.

TABLE 1

| | | | Example 1 | Example 2 | Comparative Example 1 | Comparative Example 2 | Comparative Example 3 | Comparative Example 4 |
|---|---|---|---|---|---|---|---|---|
| Adhesive composition | Polyorganosilsesquioxanes (A) | (a-1) | 53 | 29 | — | — | 77 | 100 |
| | | (a-2) | 47 | 71 | — | 100 | 23 | — |
| | | Unfractionated | — | — | 100 | — | — | — |
| | | Mw | 2300 | 2000 | 2600 | 1600 | 2800 | 3200 |
| | | Mw/Mn | 1.7 | 1.5 | 1.8 | 1.4 | 1.7 | 1.7 |
| | Solvent | PGMEA | 100 | 100 | 100 | 100 | 100 | 100 |
| | Polymerization initiator | SI-150L | 0.45 | 0.45 | 0.45 | 0.45 | 0.45 | 0.45 |
| | Polymerization stabilizer | SI Auxiliary | 0.05 | 0.05 | 0.05 | 0.05 | 0.05 | 0.05 |
| | Evaluations | Cracking resistance | Good | Good | Fair | Good | Poor | Poor |
| | | Heat resistance | Good | Good | Good | Good | — | — |
| | | Adhesiveness | Good | Good | Good | Good | — | — |
| | | Adhesion | Good | Good | Good | Good | — | — |
| | | Film-formability | Good | Good | Very good | Poor | Very good | Very good |

The solvent, polymerization initiator, and polymerization stabilizer used in the examples and comparative examples are as follows:

PGMEA: propylene glycol monomethyl ether acetate

SI-150L: antimony sulfonium salt, trade name SI-150L, supplied by SANSHIN CHEMICAL INDUSTRY CO., LTD., giving a composition having a thermal curing time of 5.4 minutes at 130° C., where the composition results from adding 1 part by weight of SI-150L to 100 parts by weight of CELLOXIDE 2021P (supplied by Daicel Corporation)

SI Auxiliary: (4-hydroxyphenyl)dimethylsulfonium methylsulfite, trade name Auxiliary for San-Aid SI series, supplied by SANSHIN CHEMICAL INDUSTRY CO., LTD.

INDUSTRIAL APPLICABILITY

The curable composition according to the present invention has excellent film-formability, resists crawling when applied typically to a substrate, and can give a coat layer having satisfactory surface smoothness. In addition, the curable composition can be cured at low temperatures to form a cured product that has heat resistance, cracking resistance, and adhesiveness and adhesion to an adherend at excellent levels. The curable composition is therefore advantageously usable as an adhesive composition. The adhesive composition, when used, can give an adhesive sheet and a stack.

Cracking and separation (or delamination), if occurring in a bonding layer of a stack, causes adherend layer separation and/or wiring (interconnection) failure, and, as a result, causes failure of a device including the stack. However, the stack formed using, as an adhesive, the curable composition according to the present invention can form a device having high reliability without cracking and delamination (or separation) in the bonding layer.

The stack according to the present invention, when being a three-dimensional stack of semiconductor chips, is more highly integrated and consumes less power as compared with conventional semiconductors (semiconductor chips). This allows the stack according to the present invention, when used, to provide smaller electronic devices having higher performance.

The invention claimed is:

1. A curable composition comprising
(A) polyorganosilsesquioxanes,
the polyorganosilsesquioxanes (A) comprising:
(a-1) a polyorganosilsesquioxane having a weight-average molecular weight of 3000 or more; and
(a-2) a polyorganosilsesquioxane having a weight-average molecular weight of 2500 or less,
the polyorganosilsesquioxanes (A) containing the polyorganosilsesquioxane (a-1) and the polyorganosilsesquioxane (a-2) in combination in a total content of 50 weight percent or more of the total amount of the polyorganosilsesquioxanes (A),
the polyorganosilsesquioxanes (A) having a ratio (weight ratio) in content of the polyorganosilsesquioxane (a-1) to the polyorganosilsesquioxane (a-2) of from 10:90 to 53:47,
the polyorganosilsesquioxanes (A) having a molecular-weight dispersity (Mw/Mn) of 1.45 to 3.0 as determined by GPC and calibrated with a polystyrene standard,
the polyorganosilsesquioxanes (a-1) and (a-2) each independently comprising
a constitutional unit represented by Formula (1):

$$[R^1SiO_{3/2}] \quad (1)$$

wherein $R^1$ represents an epoxy-containing group,
the polyorganosilsesquioxanes (a-1) and (a-2) each independently having a mole ratio of a constitutional unit represented by Formula (I) to a constitutional unit represented by Formula (II) of 5 or more,
Formulae (I) and (II) expressed as follows:

$$[R^aSiO_{3/2}] \quad (I)$$

wherein $R^a$ is selected from an epoxy-containing group, substituted or unsubstituted aryl, substituted or unsubstituted aralkyl, substituted or unsubstituted cycloalkyl, substituted or unsubstituted alkyl, substituted or unsubstituted alkenyl, and hydrogen, $$[R^bSiO_{2/2}(OR)] \quad (II)$$

wherein $R^b$ is selected from an epoxy-containing group, substituted or unsubstituted aryl, substituted or unsubstituted aralkyl, substituted or unsubstituted cycloalkyl, substituted or unsubstituted alkyl, substituted or unsubstituted alkenyl, and hydrogen; and $R^c$ is selected from hydrogen and $C_1$-$C_4$ alkyl, the polyorganosilsesquioxanes (a-1) and (a-2) each independently having a total proportion of the constitutional unit represented by Formula (1) and a constitutional unit represented by Formula (4) of 55 to 100 mole percent of the total amount (100 mole percent) of siloxane constitutional units constituting the polyorganosilsesquioxane (a-1) or (a-2), Formula (4) expressed as follows:

$$[R^1SiO_{2/2}(OR^c)] \qquad (4)$$

wherein $R^1$ is as defined in Formula (1); and $R^c$ is as defined in Formula (II).

2. The curable composition according to claim 1,
wherein the polyorganosilsesquioxane (a-1) and the polyorganosilsesquioxane (a-2) each independently further comprise a constitutional unit represented by Formula (2):

$$[R^2SiO_{3/2}] \qquad (2)$$

wherein $R^2$ is selected from substituted or unsubstituted aryl, substituted or unsubstituted aralkyl, substituted or unsubstituted cycloalkyl, substituted or unsubstituted alkyl, and substituted or unsubstituted alkenyl.

3. The curable composition according to claim 2,
wherein $R^2$ is substituted or unsubstituted aryl.

4. The curable composition according to claim 3, further comprising
a polymerization initiator.

5. The curable composition according to claim 3, further comprising
a polymerization stabilizer.

6. The curable composition according to claim 2,
wherein $R^1$ is a group selected from the class consisting of groups represented by Formulae (1a), (1b), (1c), and (1d):

[Chem. 1]

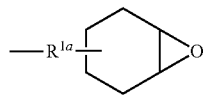 (1a)

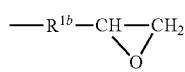 (1b)

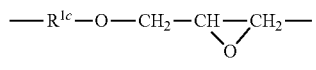 (1c)

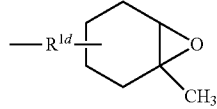 (1d)

wherein $R^{1a}$, $R^{1b}$, $R^{1c}$, and $R^{1d}$ each represent, identically or differently, linear or branched alkylene.

7. The curable composition according to claim 2, further comprising
a polymerization initiator.

8. The curable composition according to claim 2, further comprising
a polymerization stabilizer.

9. The curable composition according to claim 1,
wherein $R^1$ is a group selected from the class consisting of groups represented by Formulae (1a), (1b), (1c), and (1d):

[Chem. 1]

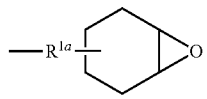 (1a)

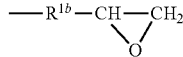 (1b)

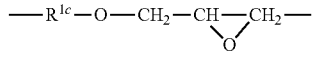 (1c)

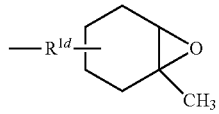 (1d)

wherein $R^{1a}$, $R^{1b}$, $R^{1c}$, and $R^{1d}$ each represent, identically or differently, linear or branched alkylene.

10. The curable composition according to claim 9,
wherein $R^2$ is substituted or unsubstituted aryl.

11. The curable composition according to claim 9, further comprising
a polymerization initiator.

12. The curable composition according to claim 9, further comprising
a polymerization stabilizer.

13. The curable composition according to claim 1, further comprising
a polymerization initiator.

14. The curable composition according to claim 1, further comprising
a polymerization stabilizer.

15. The curable composition according to claim 1, further comprising
a silane coupling agent.

16. The curable composition according to claim 1,
wherein the curable composition is an adhesive composition.

17. An adhesive sheet comprising:
a substrate; and
an adhesive sheet on or over the substrate,
the adhesive layer being a layer of the curable composition according to claim 16.

18. A cured product of the curable composition according claim 1.

19. A stack comprising three or more layers,
the three or more layers including:
two adherend layers; and
a bonding layer between the adherend layers,
the bonding layer being a layer of a cured product of a curable composition,
wherein the curable composition is an adhesive composition,
wherein the curable composition comprises
(A) polyorganosilsesquioxanes,
the polyorganosilsesquioxanes (A) comprising:
(a-1) a polyorganosilsesquioxane having a weight-average molecular weight of 3000 or more; and (a-2) a polyorganosilsesquioxane having a weight-average molecular weight of 2500 or less, the polyorganosilsesquioxane (A) containing the polyorganosilsesquioxane (a-1) and the polyorganosilsesquioxane (a-2) in combination in a total content of 50 weight percent or more of the total amount of the polyorganosilsesquioxanes (A), the polyorganosilsesquioxanes (A) having a ratio (weight ratio) in content of the polyorganosilsesquioxane (a-1) to the polyorganosilsesquioxane (a-2) of from 10:90 to 70:30, the polyorganosilsesquioxanes (a-1) and (a-2) each independently comprising a constitutional unit represented by Formula (1):

$$[R^1SiO_{3/2}] \quad (1)$$

wherein $R^1$ represents an epoxy-containing group, the polyorganosilsesquioxanes (a-1) and (a-2) each independently having a mole ratio of a constitutional unit represented by Formula (I) to a constitutional unit represented by Formula (II) of 5 or more, Formulae (I) and (II) expressed as follows:

$$[R^aSiO_{3/2}] \quad (I)$$

wherein $R^a$ is selected from an epoxy-containing group, substituted or unsubstituted aryl, substituted or unsubstituted aralkyl, substituted or unsubstituted cycloalkyl, substituted or unsubstituted alkyl, substituted or unsubstituted alkenyl, and hydrogen, $$[R^bSiO_{2/2}(OR^c)] \quad (II)$$

wherein $R^b$ is selected from an epoxy-containing group, substituted or unsubstituted aryl, substituted or unsubstituted aralkyl, substituted or unsubstituted cycloalkyl, substituted or unsubstituted alkyl, substituted or unsubstituted alkenyl, and hydrogen; and $R^c$ is selected from hydrogen and $C_1$-$C_4$ alkyl, the polyorganosilsesquioxanes (a-1) and (a-2) each independently having a total proportion of the constitutional unit represented by Formula (1) and a constitutional unit represented by Formula (4) of 55 to 100 mole percent of the total amount (100 mole percent) of siloxane constitutional units constituting the polyorganosilsesquioxane (a-1) or (a-2), Formula (4) expressed as follows:

$$[R^1SiO_{2/2}(OR^c)] \quad (4)$$

wherein $R^1$ is as defined in Formula (1); and $R^c$ is as defined in Formula (II).

20. A device comprising the stack according to claim 19.

* * * * *